(12) United States Patent
Nagatsuka

(10) Patent No.: US 8,353,460 B2
(45) Date of Patent: Jan. 15, 2013

(54) RESET SIGNAL GENERATION CIRCUIT AND SEMICONDUCTOR DEVICE

(75) Inventor: Shuhei Nagatsuka, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 486 days.

(21) Appl. No.: 12/569,332

(22) Filed: Sep. 29, 2009

(65) Prior Publication Data

US 2010/0078488 A1    Apr. 1, 2010

(30) Foreign Application Priority Data

Sep. 30, 2008  (JP) ................................. 2008-254551

(51) Int. Cl.
*G06K 19/06* (2006.01)
*H03K 3/02* (2006.01)
*H03L 7/00* (2006.01)

(52) U.S. Cl. ........................................ 235/492; 327/143
(58) Field of Classification Search .................. 235/492; 340/10.1, 10.34, 572.1; 327/142, 143, 198; 365/226, 227

See application file for complete search history.

(56) References Cited

U.S. PATENT DOCUMENTS

| 5,929,672 A * | 7/1999 | Mitani ........................... 327/143 |
| 7,224,212 B2 | 5/2007 | Tseng |
| 2003/0123567 A1 * | 7/2003 | Shigemasa et al. ........... 375/295 |
| 2005/0277241 A1 * | 12/2005 | Watanabe et al. .............. 438/200 |
| 2007/0188297 A1 * | 8/2007 | Nakane et al. .................. 340/5.6 |

FOREIGN PATENT DOCUMENTS

| JP | 2-29117 | 1/1990 |
| JP | 5-48417 | 2/1993 |
| JP | 7-58591 | 3/1995 |
| JP | 7-66682 | 3/1995 |
| JP | 11-27095 | 1/1999 |
| JP | 2006-221330 | 8/2006 |

OTHER PUBLICATIONS

International Search Report re application No. PCT/JP2009/065552, dated Oct. 27, 2009.
Written Opinion re application No. PCT/JP2009/065552, dated Oct. 27, 2009.

* cited by examiner

*Primary Examiner* — Michael G Lee
*Assistant Examiner* — Suezu Ellis
(74) *Attorney, Agent, or Firm* — Husch Blackwell LLP

(57) ABSTRACT

An object is to provide a reset signal generation circuit which has a simple circuit configuration without hysteresis characteristics so as not to occupy a larger area, and is resistant to noise and can surely generate a power-on reset signal; and to provide a semiconductor device including the reset signal generation circuit. The reset signal generation circuit includes a first buffer circuit, a low pass filter, a resistor, and a second buffer circuit. An output terminal of the first buffer circuit is electrically connected to an input terminal of the low pass filter. An output terminal of the low pass filter is electrically connected to one terminal of the resistor and an input terminal of the second buffer circuit. A constant potential is supplied to the other terminal of the resistor.

6 Claims, 16 Drawing Sheets

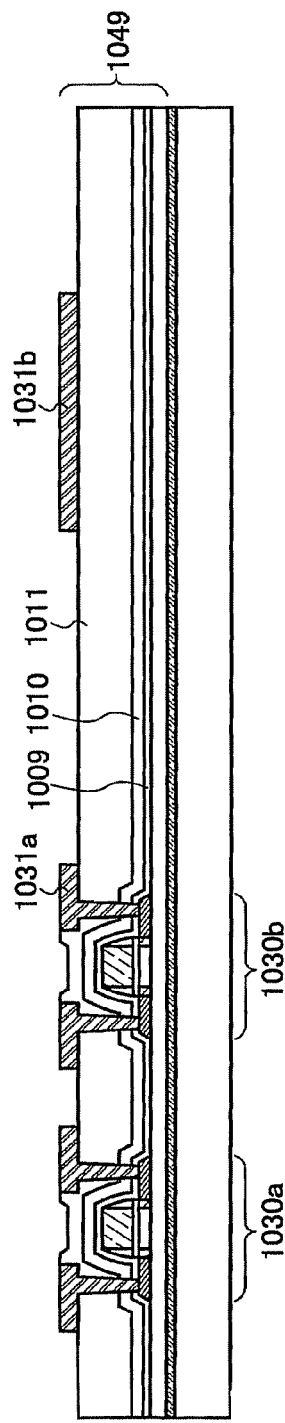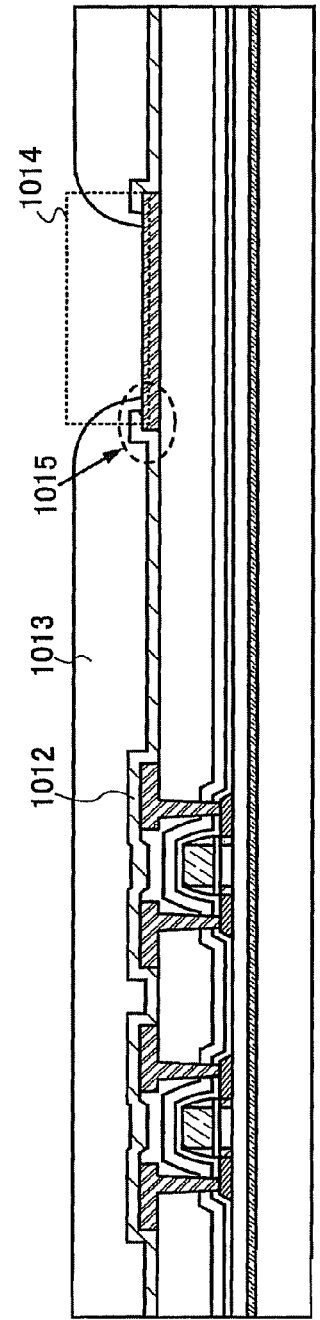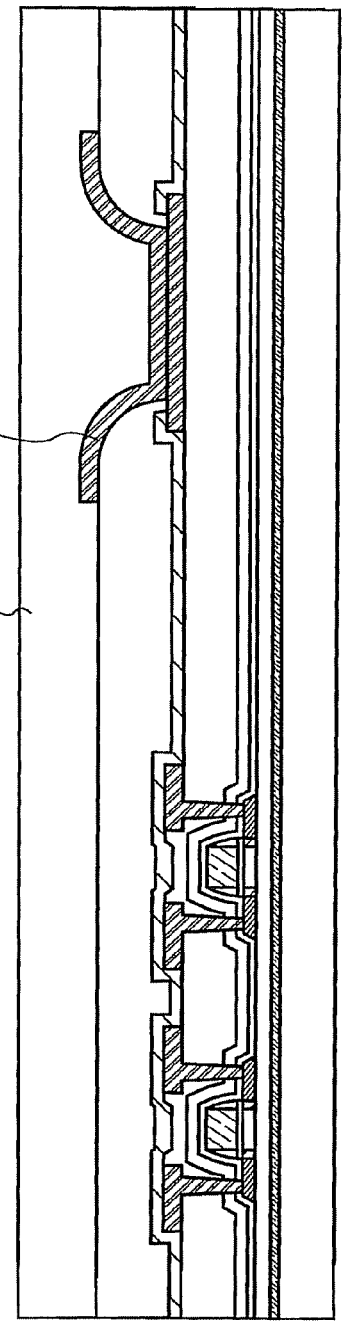
FIG. 11A
FIG. 11B
FIG. 11C

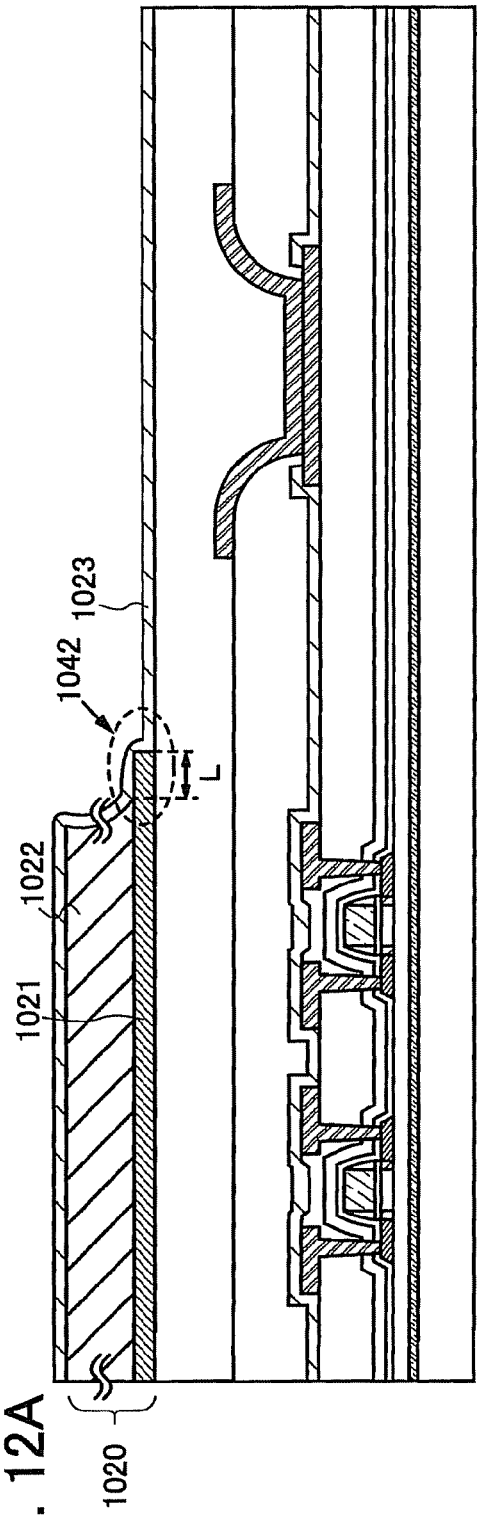
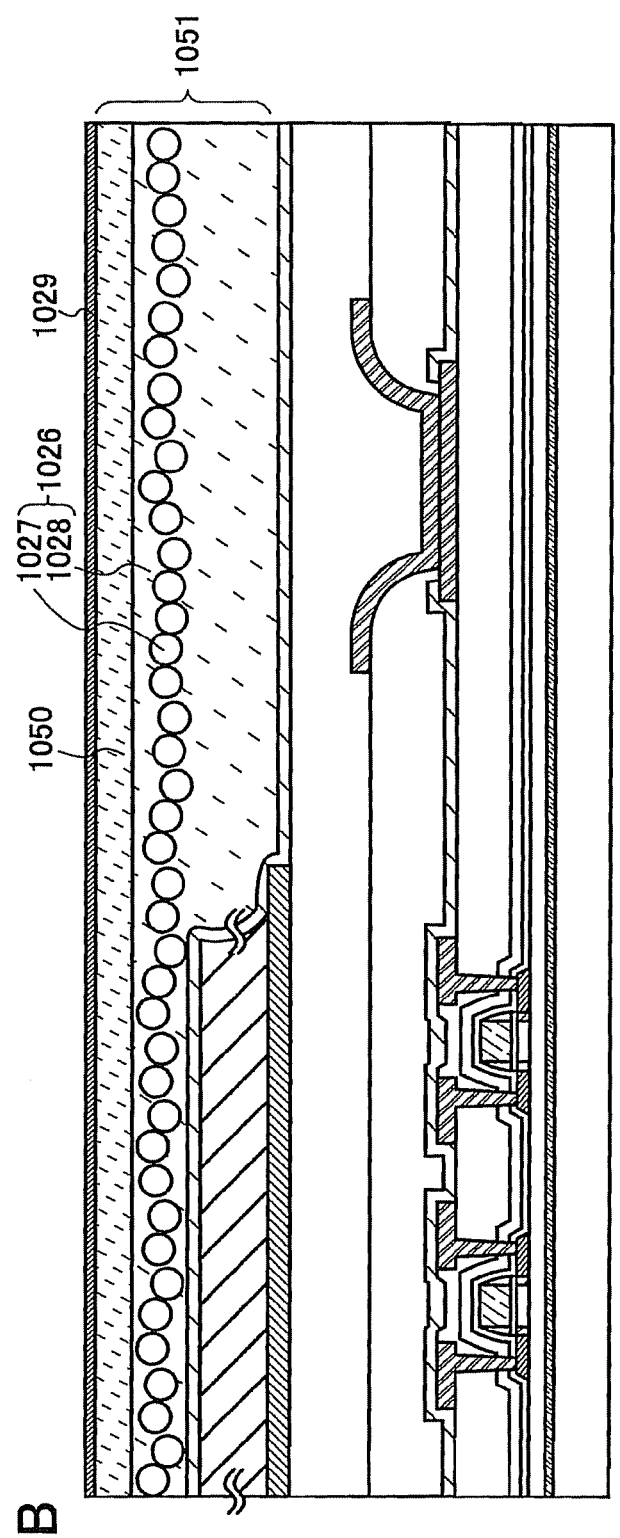
FIG. 12A
FIG. 12B

RESET SIGNAL GENERATION CIRCUIT AND SEMICONDUCTOR DEVICE

TECHNICAL FIELD

The present invention relates to a semiconductor device. Specifically, the present invention relates to a semiconductor device that can wirelessly transmit and receive data. More specifically, the present invention relates to a configuration of a reset signal generation circuit included in the semiconductor device.

BACKGROUND ART

In recent years, an individual identification technique using wireless communication with an electromagnetic field, an electric wave, or the like has attracted attention. In particular, an individual identification technique which employs an RFID (radio frequency identification) tag as a semiconductor device that wirelessly communicates data has attracted attention. The RFID tag is also referred to as an IC tag, an IC chip, an RF tag, a wireless tag, or an electronic tag.

RFID tags can be classified into two types: an active RFID tag that includes a power supply necessary for the circuit operation accompanying transmission and reception of data to/from an external wireless communication device (hereinafter referred to as a reader/writer), and a passive RFID tag that is driven by generating electric power inside the RFID tag by using electronic power of electromagnetic waves from a reader/writer. It is well known that a large number of passive RFID tags typified by Suica, PASMO, and ICOCA (which are registered trademarks) come on the market.

FIG. 16 illustrates an example of a wireless communication system using a passive RFID tag. The wireless communication system is constituted by a reader/writer 1601, a control terminal 1603, and a passive RFID tag 1605. The control terminal 1603 controls the reader/writer 1601. Data is wirelessly transmitted and received between an antenna 1602 connected to the reader/writer 1601 and an antenna 1606 of the passive RFID tag 1605.

Wireless data transmission and reception are performed as follows. A wireless signal output from the antenna 1602 connected to the reader/writer 1601 is received by the antenna 1606 in the passive RFID tag 1605. The wireless signal is an electromagnetic wave which is modulated in accordance with the data to be transmitted. An electromagnetic wave for transmitting data is referred to as a carrier wave. A wireless signal is also referred to as a carrier wave which is modulated in accordance with data. A wireless signal (hereinafter simply referred to as a carrier wave) 1604 is received by the antenna 1606 and input to a signal processing circuit 1609 to be processed through a power supply circuit 1607 and a demodulation circuit 1608 in the passive RFID tag 1605. In such a manner, the passive RFID tag 1605 obtains data included in the carrier wave 1604. Then, a signal containing response data is output from the signal processing circuit 1609. The passive RFID tag 1605 transmits the carrier wave 1604 corresponding to the signal to the antenna 1602 connected to the reader/writer 1601, through a modulation circuit 1610 and the antenna 1606 in the passive RFID tag 1605. The carrier wave 1604 corresponding to the signal is received by the antenna 1602, and the reader/writer 1601 obtains the response data and the response data is stored in the control terminal 1603.

The power supply circuit 1607 in the passive RFID tag 1605 generates a direct-current power supply voltage for driving the signal processing circuit 1609, based on the carrier wave received by the antenna 1606. Examples of a specific configuration of the power supply circuit 1607 are a half-wave rectifier circuit, a half-wave voltage doubler rectifier circuit, and a full-wave rectifier circuit.

Moreover, the demodulation circuit 1608 in the passive RFID tag 1605 demodulates components of a modulation signal included in the carrier wave received by the antenna 1606 and generates a demodulation signal for driving the signal processing circuit 1609. For such a passive RFID tag, improvement in capability of reading a wireless signal from a reader/writer has been actively researched (e.g., see Patent Document 1).

REFERENCE

Patent Document 1: Japanese Published Patent Application No. 2006-221330

DISCLOSURE OF INVENTION

In order to perform in a series of operations described with reference to FIG. 16, the passive RFID tag needs to initialize registers included in the signal processor circuit during a period when electrically power is supplied until the passive RFID tag starts to receive a command. Accordingly, power-on reset using the time of electric power supply is necessary.

It is known that problems such as the length of rise of a power supply and noise are likely to occur when a power-on reset signal is generated. In order to avoid such adverse effects, a power-on reset signal generation circuit tends to have hysteresis characteristics.

However, when the power-on reset signal generation circuit has a configuration with hysteresis characteristics, the circuit becomes complicated and occupies a larger area in the entire semiconductor device.

In light of the above, an object of one embodiment of the present invention is to provide a reset signal generation circuit which has a simple circuit configuration without hysteresis characteristics so as not to occupy a larger area, and is resistant to noise and can surely generate a power-on reset signal. Another object is to provide a semiconductor device including such a reset signal generation circuit.

In order to solve the above problem, a reset signal generation circuit which is one embodiment of the present invention includes a first buffer circuit, a low pass filter, a resistor, and a second buffer circuit. In the first buffer circuit, a node is separated from a power supply. In the low pass filter, noise is removed and sufficient rise delay is generated with respect to rise of the power supply. The waveform is shaped in the second buffer circuit. The initialization operation in the reset signal generation circuit at the time when power is turned off is performed by the resistor.

One embodiment of the present invention is a reset signal generation circuit including a first buffer circuit; a low pass filter; a resistor; and a second buffer circuit. An output terminal of the first buffer circuit is electrically connected to an input terminal of the low pass filter. An output terminal of the low pass filter is electrically connected to one terminal of the resistor and an input terminal of the second buffer circuit. A constant potential is supplied to the other terminal of the resistor.

The low pass filter delays a signal output from the first buffer circuit. The second buffer circuit shapes a waveform of the signal delayed by the low pass filter. The initialization operation is performed by discharging electric charge held in the low pass filter through the resistor to a wiring connected to the other terminal of the resistor when supply of the constant potential is stopped, that is, when power is turned off.

One embodiment of the present invention is a reset signal generation circuit including first to third buffer circuits; first and second low pass filters; and first and second resistors. An output terminal of the first buffer circuit is electrically connected to an input terminal of the first low pass filter. An output terminal of the first low pass filter is electrically connected to one terminal of the first resistor and an input terminal of the second buffer circuit. A constant potential is supplied to the other terminal of the first resistor. An output terminal of the second buffer circuit is electrically connected to an input terminal of the second low pass filter. An output terminal of the second low pass filter is electrically connected to one terminal of the second resistor and an input terminal of the third buffer circuit. A constant potential is supplied to the other terminal of the second resistor.

A signal output from the first buffer circuit is delayed by the first low pass filter. A waveform of the signal delayed by the first low pass filter is shaped by the second buffer circuit. A signal output from the second buffer circuit is delayed by the second low pass filter. A waveform of the signal delayed by the second low pass filter is shaped by the third buffer circuit. The initialization operation is performed by discharging electric charge held in the first and second low pass filters through the first and second resistors to wirings connected to the other terminals of the first and second resistors, respectively, when power is turned off.

One embodiment of the present invention is a reset signal generation circuit including an antenna; a rectifier circuit configured to generate an internal power supply from a signal received by the antenna; a demodulation circuit configured to demodulate a signal received by the antenna; a reset signal generation circuit configured to generate a reset signal from the internal power supply; a signal processing circuit configured to perform predetermined operation using the internal power supply, a demodulation signal generated in the demodulation circuit, and the reset signal; and a modulation circuit configured to modulate a response signal generated in the signal processing circuit into a wireless signal. The reset signal generation circuit includes a first buffer circuit, a low pass filter, a resistor, and a second buffer circuit. An input terminal of the first buffer circuit is electrically connected to an output terminal of the rectifier circuit. An output terminal of the first buffer circuit is electrically connected to an input terminal of the low pass filter. An output terminal of the low pass filter is electrically connected to one terminal of the resistor and an input terminal of the second buffer circuit. An output terminal of the second buffer circuit is electrically connected to an input terminal of the signal processing circuit. A constant potential is supplied to the other terminal of the resistor.

A signal output from the first buffer circuit is delayed by the low pass filter. A waveform of the signal delayed by the low pass filter is shaped by the second buffer circuit. The initialization operation of the reset signal generation circuit is performed by discharging electric charge held in the low pass filter in the reset signal generation circuit through the resistor to a wiring connected to the other terminal of the resistor when power is turned off.

One embodiment of the present invention is a reset signal generation circuit including an antenna; a rectifier circuit configured to generate an internal power supply from a signal received by the antenna; a demodulation circuit configured to demodulate a signal received by the antenna; a reset signal generation circuit configured to generate a reset signal from the internal power supply; a signal processing circuit configured to perform predetermined operation using the internal power supply, a demodulation signal generated in the demodulation circuit, and the reset signal; and a modulation circuit configured to modulate a response signal generated in the signal processing circuit into a wireless signal. The reset signal generation circuit includes first to third buffer circuits, first and second low pass filters, and first and second resistors. An input terminal of the first buffer circuit is electrically connected to an output terminal of the rectifier circuit. An output terminal of the first buffer circuit is electrically connected to an input terminal of the first low pass filter. An output terminal of the first low pass filter is electrically connected to one terminal of the first resistor and an input terminal of the second buffer circuit. A constant potential is supplied to the other terminal of the first resistor. An output terminal of the second buffer circuit is electrically connected to an input terminal of the second low pass filter. An output terminal of the second low pass filter is electrically connected to one terminal of the second resistor and an input terminal of the third buffer circuit. An output terminal of the third buffer circuit is electrically connected to an input terminal of the signal processing circuit. A constant potential is supplied to the other terminal of the second resistor.

A signal output from the first buffer circuit is delayed by the first low pass filter. A waveform of the signal delayed by the first low pass filter is shaped by the second buffer circuit. A signal output from the second buffer circuit is delayed by the second low pass filter. A waveform of the signal delayed by the second low pass filter is shaped by the third buffer circuit. The initialization operation is performed by discharging electric charge held in the first and second low pass filters through the first and second resistors to wirings connected to the other terminals of the first and second resistors, respectively, when power is turned off.

The semiconductor device according to one embodiment of the present invention can be used for a passive wireless tag driven by generating the internal power supply by using electronic power of an electromagnetic wave from a reader/writer.

Note that in this specification, being "connected" means being "electrically connected" unless otherwise specified.

By the provision of a reset signal generation circuit which is one embodiment of the present invention, a sufficient reset signal period can be obtained. Moreover, when a non-contact wireless communication device is provided with the reset signal generation circuit which is one embodiment of the present invention, the certainty of the initialization operation for registers provided in the non-contact wireless communication device is improved, so that startup failure due to repetitive operations of on and off of wireless electric power can be prevented. Further, since the reset signal generation circuit has a simple circuit configuration without hysteresis characteristics, the circuit in the non-contact wireless communication device can be simplified, and it is possible to reduce the size and variation of the non-contact wireless communication devices.

BRIEF DESCRIPTION OF DRAWINGS

In the accompanying drawings:

FIGS. 11A to 11C illustrate a method for manufacturing a semiconductor device according to one embodiment of the present invention;

FIGS. 12A and 12B illustrate a method for manufacturing a semiconductor device according to one embodiment of the present invention;

BEST MODE FOR CARRYING OUT THE INVENTION

Figure 1:
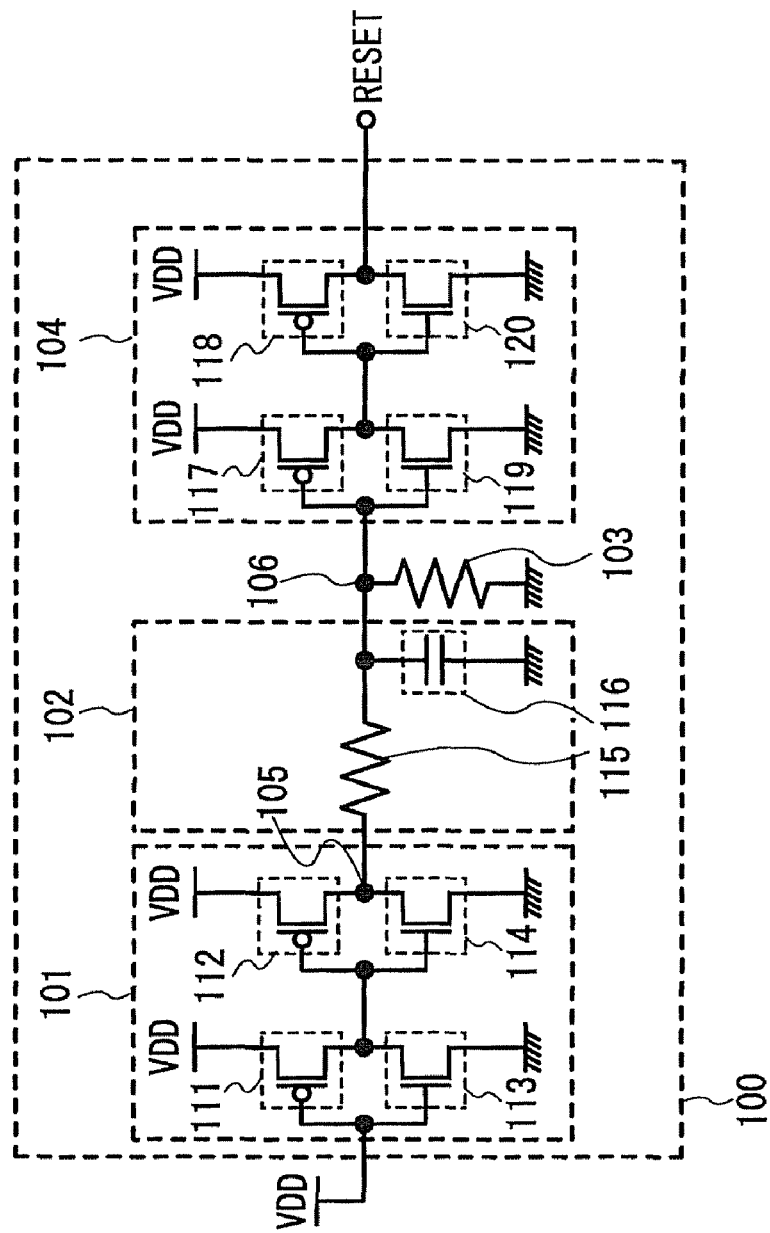
FIG. 1 illustrates a semiconductor device according to one embodiment of the present invention.

Embodiments of the present invention will be described in detail with reference to the accompanying drawings. Note that the present invention is not limited to the following description, and it is easily understood by those skilled in the art that modes and details of the present invention can be variously changed without departing from the spirit and the scope of the present invention. Therefore, the present invention is not construed as being limited to the description of the embodiments. In the structures of the present invention described below, reference numerals indicating the same portions may be used in common in different drawings.

Embodiment 1

A reset signal generation circuit which is one embodiment of the present invention will be described with reference to FIG. 1. A reset signal generation circuit 100 which is one embodiment of the present invention includes a first buffer circuit 101, a low pass filter 102, a resistor 103, and a second buffer circuit 104. The first buffer circuit 101 includes a p-channel transistor 111, a p-channel transistor 112, an n-channel transistor 113, and an n-channel transistor 114. The low pass filter 102 includes a resistor 115 and a capacitor 116. The second buffer circuit 104 includes a p-channel transistor 117, a p-channel transistor 118, an n-channel transistor 119, and an n-channel transistor 120. An input signal of the first buffer circuit 101 is a power supply voltage VDD. An output terminal of the first buffer circuit 101 is connected to an input terminal of the low pass filter 102. Note that a portion where the first buffer circuit 101 and the low pass filter 102 are connected is referred to as a node 105. An output terminal of the low pass filter 102 is connected to a first terminal of the resistor 103 and an input terminal of the second buffer circuit 104 through a node 106. A second terminal of the resistor 103 is connected to GND. An output terminal of the second buffer circuit 104 outputs a reset signal. The resistor 103 has a function of discharging electric charge left in the circuit through the resistor 103 and initializes the reset signal generation circuit. Note that the resistor 103 is connected to the output terminal of the low pass filter 102 in FIG. 1; however, the resistor 103 may be connected to the input terminal of the low pass filter 102. Note that "GND" in this specification and the drawing refers to a reference potential of the entire circuit. GND in the drawing signifies that the portion is connected to the reference potential of the entire circuit.

Figure 2:
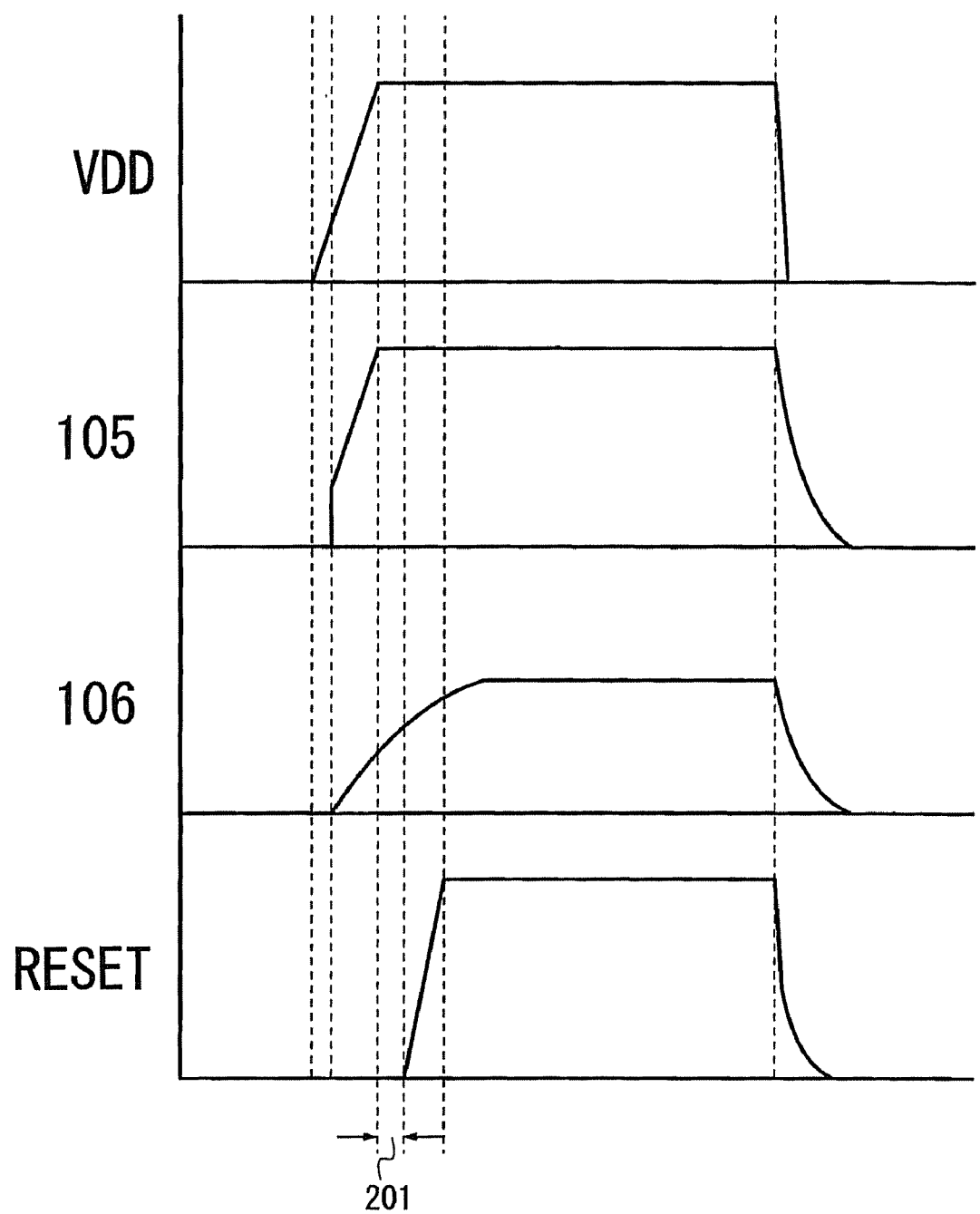
FIG. 2 illustrates a semiconductor device according to one embodiment of the present invention.

FIG. 2 illustrates signal waveforms at the nodes in this embodiment.

When the power supply voltage VDD is on, it rises with a certain inclination. The first buffer circuit 101 receives this waveform, and a waveform at the node 105 is output when the power supply voltage VDD is higher than a predetermined voltage. After that, the waveform at the node 105 rises so as to follow the power supply voltage VDD.

In response to the rise of the waveform at the node 105, the low pass filter 102 and the resistor 103 generate a waveform at the node 106. The waveform at the node 106 is gentler than that at the node 105 due to the low pass filter 102. Moreover, the maximum voltage achieved at the node 106 is lower than the power supply voltage VDD due to the voltage division ratio of the p-channel transistor 112 in the first buffer circuit 101 and the resistor 115 in the low pass filter 102 to the resistor 103.

Here, the maximum voltage achieved at the node 106 should be high enough to normally operate the second buffer circuit 104. Accordingly, when needed, the resistance of the resistor 103 is changed, although it depends on the delay time and design for removing noise by the low pass filter 102. Note that this design is easily understood by those skilled in the art; therefore, specific values are not specified here.

In response to the node 106, the second buffer circuit 104 shapes the waveform which has become gentler by the low pass filter 102, and makes the maximum voltage achieved return to the power supply voltage VDD. Thus, a signal generated in the second buffer circuit 104 rises sufficiently later than the rise of the power supply voltage VDD. A period 201 before the signal rises with delay can be used as the reset signal.

When the power supply voltage VDD is off, the reset signal is also off. Note that only at the node 106, electric charge is held by the capacitor 116 in the low pass filter 102, and it takes time to discharge the electric charge. At this time, the time it takes to make the electric charge at the node 106 disappear is obtained from the capacitance of the capacitor 116 in the low pass filter 102 and the resistance of the resistor 103. Note that each of the power supply voltage VDD and the voltage at the node 105 becomes a predetermined voltage at the same timing in FIG. 2; however, gate delay occurs in practice, and the timing when the voltage at the node 105 becomes a predetermined voltage is slightly delayed. Since this delayed period is extremely shorter than the period when the reset signal is generated, it is omitted in FIG. 2. Similarly, effect on gate delay is not shown in other timing charts in this specification.

Figure 8:
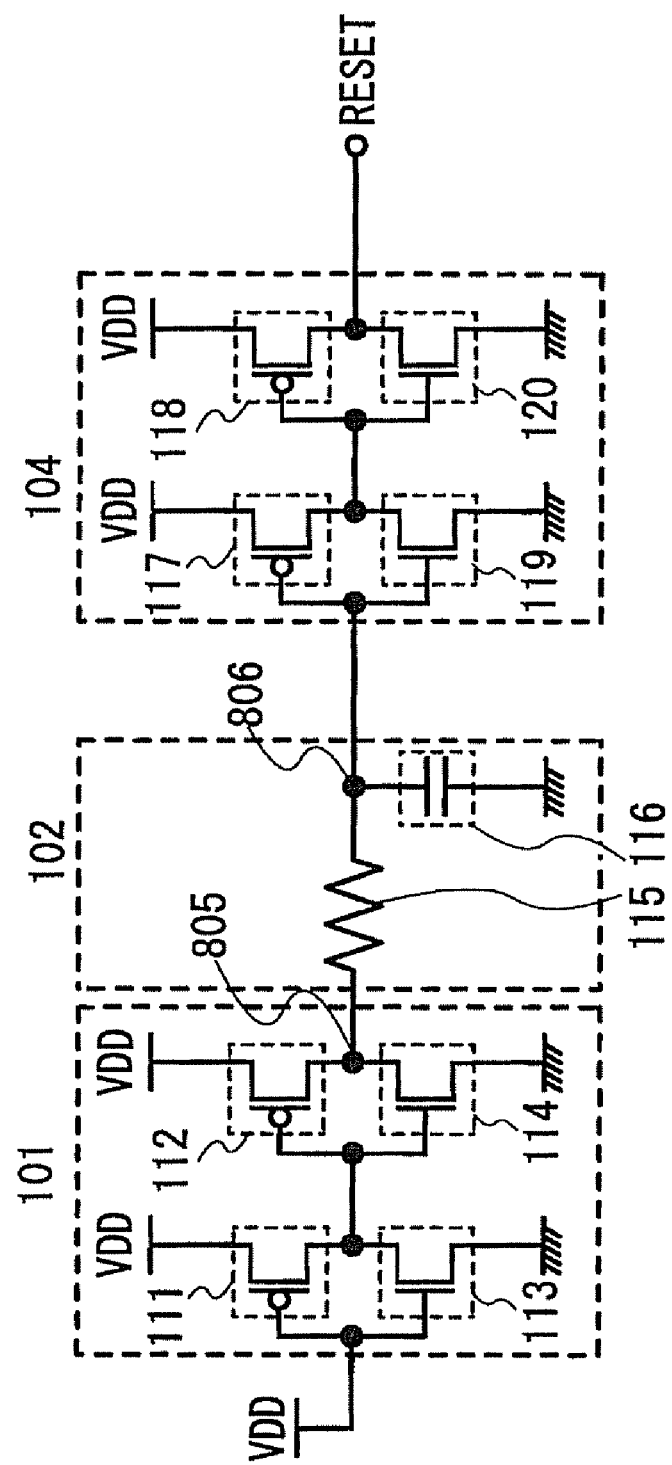
FIG. 8 illustrates an example of a semiconductor device compared to a semiconductor device according to one embodiment of the present invention.

FIG. 8 illustrates an example of a circuit configuration in which the resistor 103 is not provided in the configuration of FIG. 1, as an example compared to the invention according to this embodiment.

Figure 9:
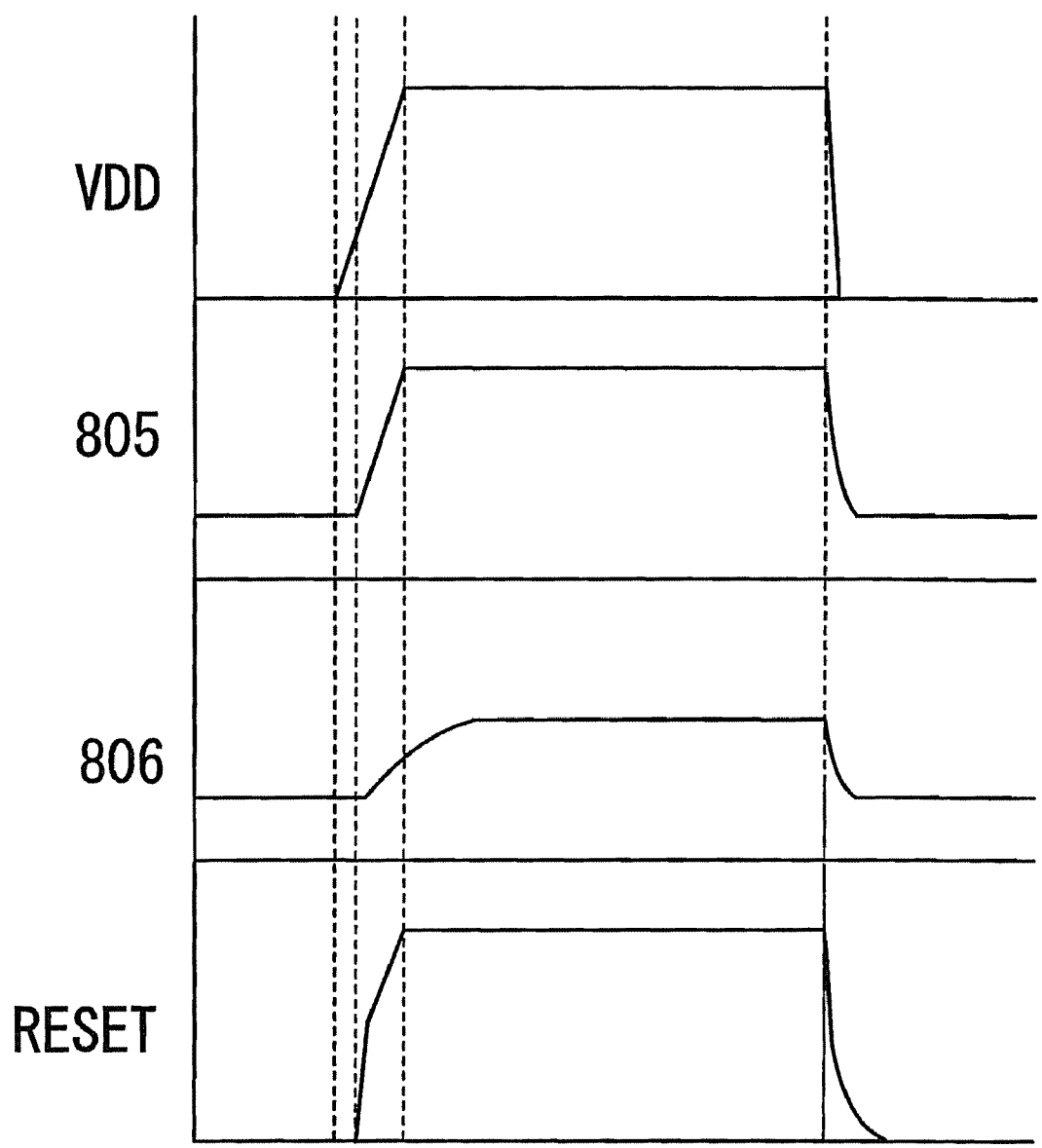
FIG. 9 illustrates an example of a semiconductor device compared to a semiconductor device according to one embodiment of the present invention.

FIG. 9 illustrates signal waveforms at an input terminal of the first buffer circuit 101, to which the power supply voltage VDD is supplied; a node 805 where the first buffer circuit 101 and the low pass filter 102 are connected; a node 806 where the low pass filter 102 and the second buffer circuit 104 are connected; and an output terminal of the second buffer circuit 104, from which the reset signal is output, which are illustrated in FIG. 8.

In that case, when the power supply voltage VDD is off, as for electric charge at the node 806, a current from the capacitor in the low pass filter 102 flows only to the p-channel transistor 112 in the first buffer circuit 101. Note that electric charge for the threshold voltage of the p-channel transistor 112 is left at the nodes 805 and 806. Accordingly, when the power supply voltage VDD is on again, the reset signal cannot be normally generated as illustrated in FIG. 9 by being affected by the electric charge left at the nodes 805 and 806.

Since the reset signal generation circuit which is one embodiment of the present invention includes the resistor 103 as illustrated in FIG. 1, electric charge held in the capacitor 116 provided in the low pass filter 102 can be removed when a semiconductor device is off. Thus, the reset signal can be generated as appropriate as illustrated in FIG. 2, so that the certainty of the initialization operation for registers connected to the reset signal generation circuit can be increased, and startup failure of the semiconductor device can be prevented.

Embodiment 2

Figure 3:
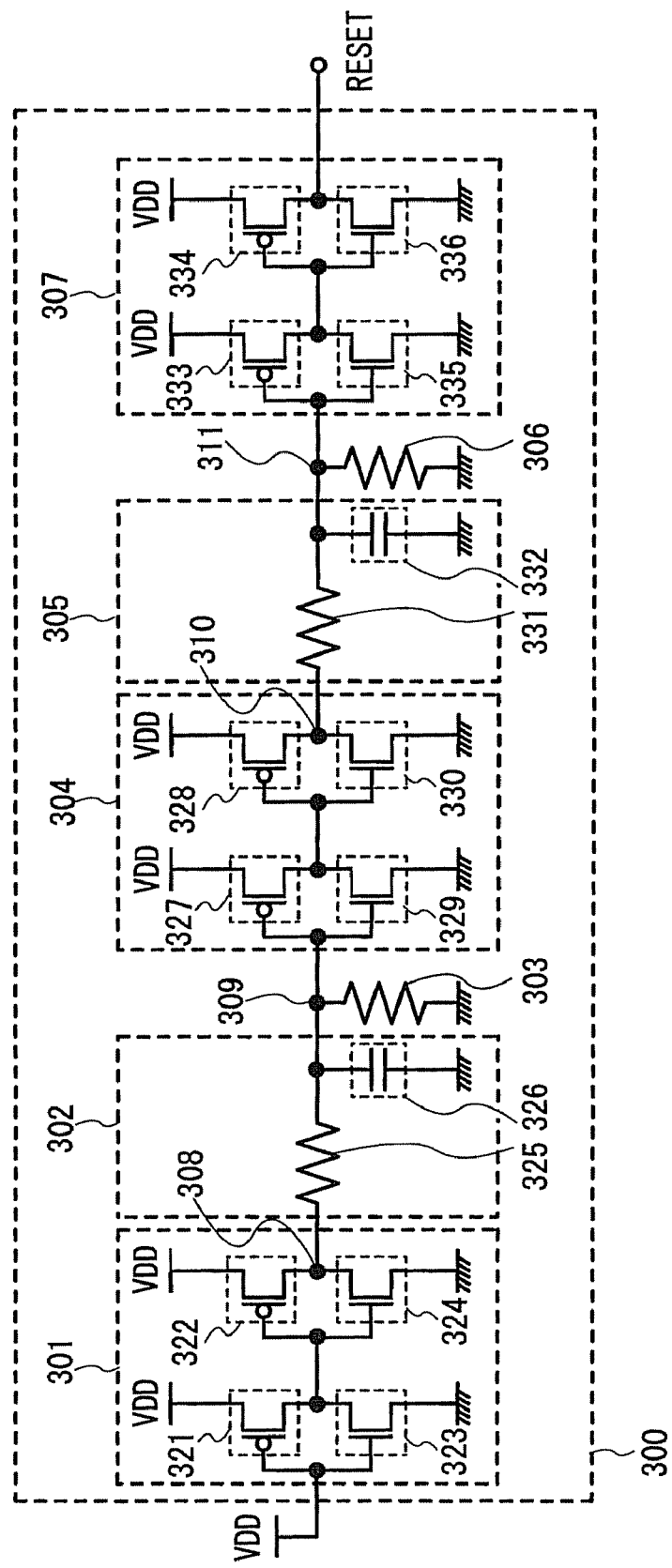
FIG. 3 illustrates a semiconductor device according to one embodiment of the present invention.

A reset signal generation circuit which is another embodiment of the present invention will be described with reference to FIG. 3. A reset signal generation circuit 300 which is another embodiment of the present invention includes a first buffer circuit 301, a first low pass filter 302, a first resistor 303, a second buffer circuit 304, a second low pass filter 305, a second resistor 306, and a third buffer circuit 307. The first buffer circuit 301 includes a p-channel transistor 321, a p-channel transistor 322, an n-channel transistor 323, and an n-channel transistor 324. The first low pass filter 302 includes a resistor 325 and a capacitor 326. The second buffer circuit 304 includes a p-channel transistor 327, a p-channel transistor 328, an n-channel transistor 329, and an n-channel transistor 330. The second low pass filter 305 includes a resistor 331 and a capacitor 332. The third buffer circuit 307 includes a p-channel transistor 333, a p-channel transistor 334, an n-channel transistor 335, and an n-channel transistor 336.

An input signal of the first buffer circuit 301 is the power supply voltage VDD. An output terminal of the first buffer circuit 301 is connected to an input terminal of the first low pass filter 302. Note that a portion where the first buffer circuit 301 and the first low pass filter 302 are connected is referred to as a node 308. An output terminal of the first low pass filter 302 is connected to a first terminal of the first resistor 303 and an input terminal of the second buffer circuit 304 through a node 309. An output terminal of the first low pass filter 302 is connected to a first terminal of the first resistor 303 and an input terminal of the second buffer circuit 304 through a node 309. A second terminal of the first resistor 303 is connected to GND. An output terminal of the second buffer circuit 304 is connected to an input terminal of the second low pass filter 305. Note that a portion where the second buffer circuit 304 and the second low pass filter 305 are connected is referred to as a node 310. An output terminal of the second low pass filter 305 is connected to a first terminal of the second resistor 306 and an input terminal of the third buffer circuit 307 through a node 311. A second terminal of the second resistor 306 is connected to GND. An output terminal of the third buffer circuit 307 outputs a reset signal. The first resistor 303 and the second resistor 306 have a function of transferring electric charge left in the first low pass filter 302 and the second low pass filter 305 respectively to GND, and initialize the reset signal generation circuit. Note that the first resistor 303 is connected to the output terminal of the first low pass filter 302 in FIG. 3; however, the first resistor 303 may be connected to the input terminal of the first low pass filter 302. Similarly, the second resistor 306 may be connected to the input terminal of the second low pass filter 305.

Figure 4:
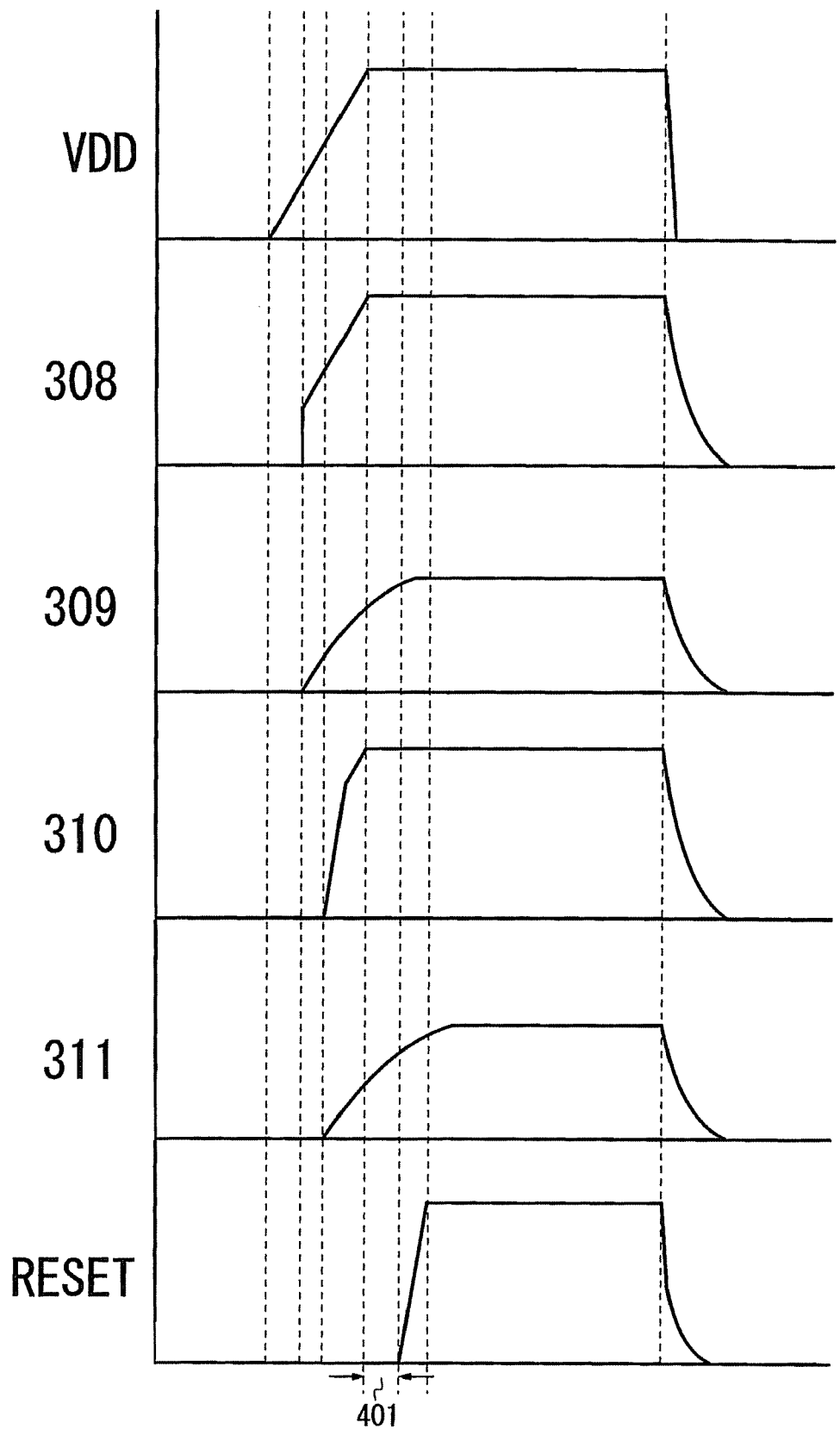
FIG. 4 illustrates a semiconductor device according to one embodiment of the present invention.

FIG. 4 illustrates signal waveforms at the nodes in this embodiment. Note that in an example of this embodiment, the rise of the power supply voltage VDD is gentler than that in Embodiment 1.

When the power supply voltage VDD is on, it rises with a certain inclination. The first buffer circuit 301 receives this waveform, and a waveform at the node 308 is output when the power supply voltage VDD is higher than a predetermined voltage. After that, the waveform at the node 308 rises so as to follow the power supply voltage VDD.

In response to the rise of the waveform at the node 308, the first low pass filter 302 and the first resistor 303 generate a waveform at the node 309. The waveform at the node 309 is gentler than that at the node 308 due to the first low pass filter 302. Moreover, the maximum voltage achieved at the node 309 is lower than the power supply voltage VDD due to the voltage division ratio of the p-channel transistor 322 in the first buffer circuit 301 and the resistor 325 in the first low pass filter 302 to the first resistor 303.

Here, the maximum voltage achieved at the node 309 should be high enough to normally operate the second buffer circuit 304. Accordingly, when needed, the resistance of the first resistor 303 is changed, although it depends on the delay time and design for removing noise by the first low pass filter 302. Note that this design is easily understood by those skilled in the art; therefore, specific values are not specified here.

In response to the node 309, the second buffer circuit 304 shapes the waveform which has become gentler by the first low pass filter 302, and makes the maximum voltage achieved return to the power supply voltage VDD. Thus, a signal at the node 310, which is generated in the second buffer circuit 304, is a signal that rises sufficiently later than the rise of the power supply voltage VDD.

In response to the rise of the waveform at the node 310, the second low pass filter 305 and the second resistor 306 generate a waveform at the node 311. The waveform at the node 311 is gentler than that at the node 310 due to the second low pass filter 305. Moreover, the maximum voltage achieved at the node 311 is lower than the power supply voltage VDD due to the voltage division ratio of the p-channel transistor 328 in the second buffer circuit 304 and the resistor 331 in the second low pass filter 305 to the second resistor 306.

Here, the maximum voltage achieved at the node 311 should be high enough to normally operate the third buffer circuit 307. Accordingly, when needed, the resistance of the second resistor 306 is changed, although it depends on the delay time and design for removing noise by the second low pass filter 305. Note that this design is easily understood by those skilled in the art; therefore, specific values are not specified here.

In response to the node 311, the third buffer circuit 307 shapes the waveform which has become gentler by the second low pass filter 305, and makes the maximum voltage achieved return to the power supply voltage VDD. Thus, a signal generated in the third buffer circuit 307 is a signal that rises sufficiently later than the rise of the power supply voltage VDD. A period 401 before the signal rises with delay can be used as the reset signal.

When the power supply voltage VDD is off, the reset signal is also off. Note that at the node 309 and the node 311, electric charge is held by the capacitor 326 in the first low pass filter 302 and the capacitor 332 in the second low pass filter 305 respectively, and it takes time to discharge the electric charge. At this time, the time it takes to make the electric charge at the node 309 disappear is obtained from the capacitance of the capacitor 326 in the first low pass filter 302 and the resistance of the first resistor 303. Moreover, the time it takes to make the electric charge at the node 311 disappear is obtained from the capacitance of the capacitor 332 in the second low pass filter 305 and the resistance of the second resistor 306.

In this embodiment, the rise of the power supply voltage VDD is slower than that in the example in Embodiment 1, and a low pass filter, a resistor, and a buffer circuit are added to the example of the circuit in Embodiment 1 so that a reset signal can surely be generated. As described above, when at least one low pass filter, one resistor, and one buffer circuit are added to the example of the circuit in Embodiment 1, a method of generating a reset signal with more certainty can be realized.

In addition, when the configuration in this embodiment is used, it is not necessary to gain the delay time needed to generate a reset signal only by one low pass filter as in Embodiment 1. Accordingly, the rise time of the reset signal can be sufficiently secured with respect to the rise of the power supply voltage VDD. Further, the provision of a plurality of low pass filters can realize a circuit configuration with higher noise resistance.

Note that this embodiment shows an example of the configuration where the first to third buffer circuits and the first and second low pass filters are provided. Alternatively, a low pass filter and a resistor are further connected to the output terminal of the third buffer circuit 307.

Embodiment 3

Figure 5:
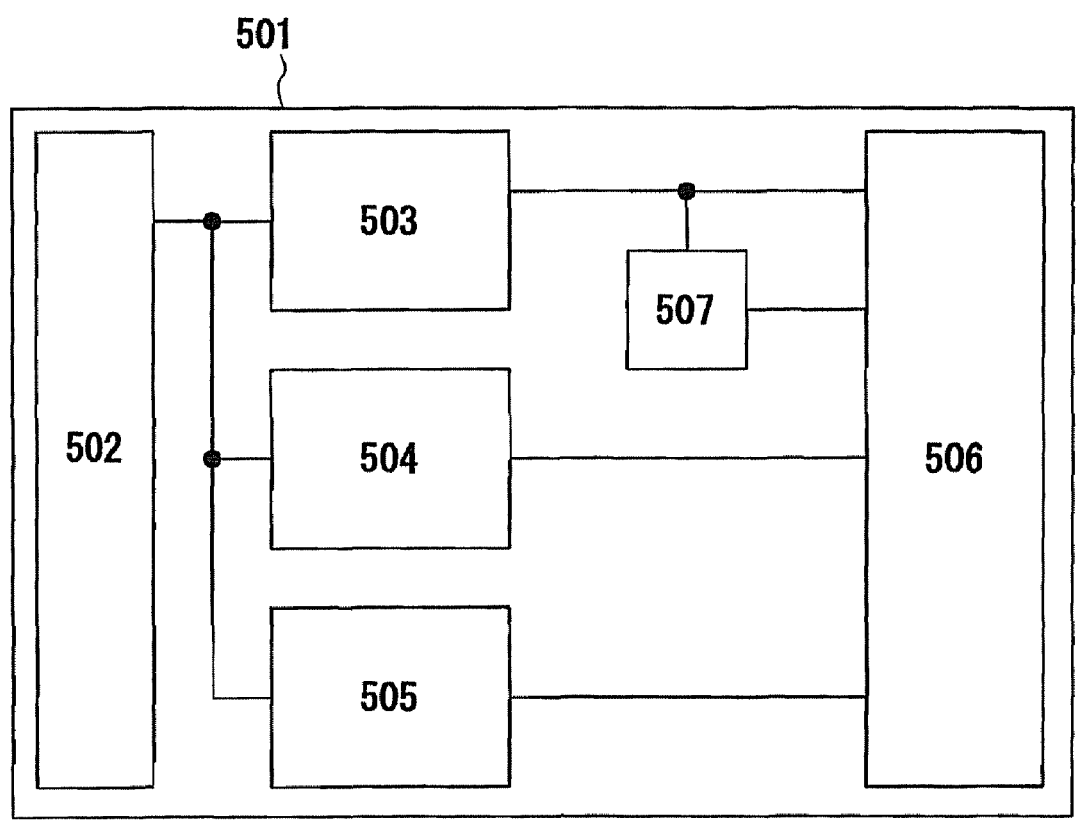
FIG. 5 illustrates a semiconductor device according to one embodiment of the present invention.

FIG. 5 illustrates a passive RFID tag which is a semiconductor device including a reset signal generation circuit which is one embodiment of the present invention. A passive RFID tag 501 includes an antenna 502 which receives a wireless signal; a rectifier circuit 503 which generates an internal power supply based on electric power received by the antenna 502; a demodulation circuit 504 which generates a demodulation signal from the wireless signal received by the antenna 502; a reset signal generation circuit 507 which generates a reset signal from the internal power supply generated in the rectifier circuit 503; a signal processing circuit 506 which operates using the internal power supply generated in the rectifier circuit 503, the demodulation signal generated in the demodulation circuit 504, and the reset signal generated in the reset signal generation circuit 507, and generates a response signal; and a modulation circuit 505 which modulates the response signal generated in the signal processing circuit 506 into a wireless signal.

In the structure in this embodiment, the signal processing circuit 506 operates based on the internal power supply generated in the rectifier circuit 503. The signal processing circuit 506 includes a plurality of registers, which need to be initialized before the signal processing circuit 506 operates using the demodulation signal generated in the demodulation circuit 504. Accordingly, each register in the signal processing circuit 506 is initialized by the reset signal which is generated by the reset signal generation circuit 507 based on the internal power supply generated in the rectifier circuit 503.

Note that the reset signal generation circuit used in the structure in this embodiment may have either of the configurations shown in Embodiments 1 and 2. In addition, the structure in this embodiment is an example, and one embodiment of the present invention is not limited to this structure.

Embodiment 4

Figure 6:
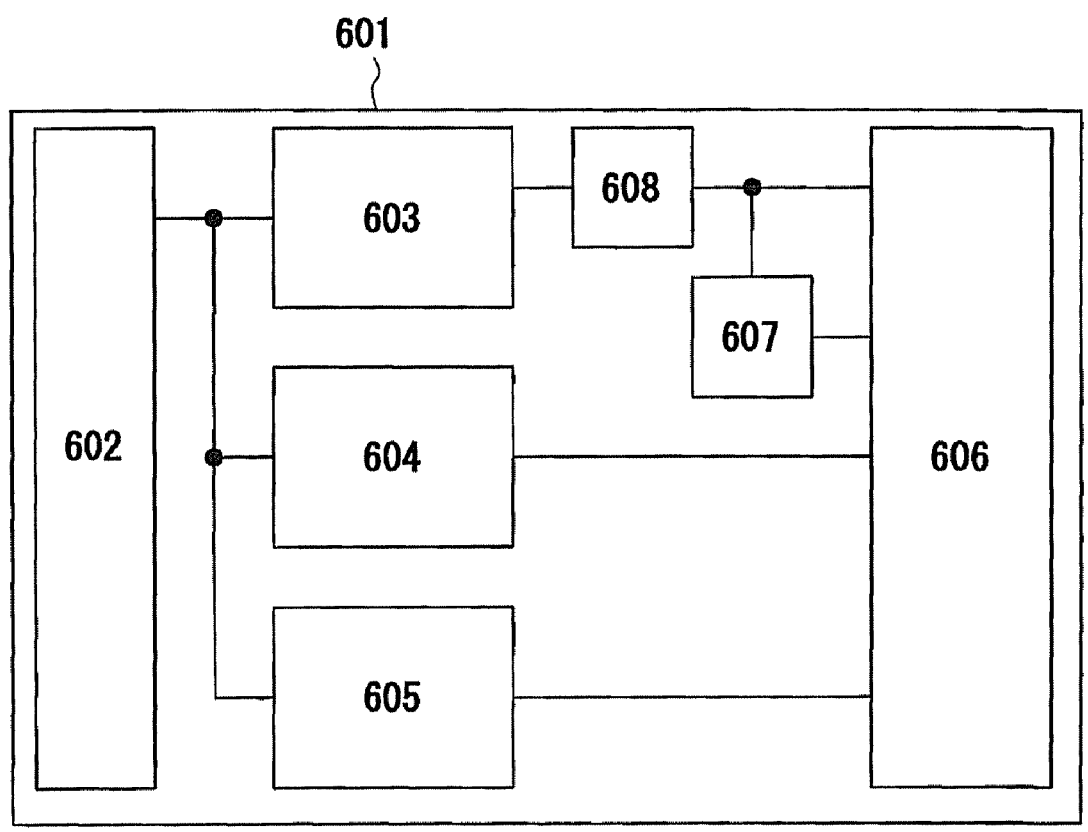
FIG. 6 illustrates a semiconductor device according to one embodiment of the present invention.

FIG. 6 illustrates a passive RFID tag which is a semiconductor device including a reset signal generation circuit of one embodiment of the present invention, which is different from that in Embodiment 3. A passive RFID tag 601 includes an antenna 602 which receives a wireless signal; a rectifier circuit 603 which generates an internal power supply based on electric power received by the antenna 602; a regulator 608 which generates a constant voltage based on the internal power supply generated in the rectifier circuit 603; a demodulation circuit 604 which generates a demodulation signal from the wireless signal received by the antenna 602; a reset signal generation circuit 607 which generates a reset signal from the constant voltage generated in the regulator 608; a signal processing circuit 606 which operates using the constant voltage generated in the regulator 608, the demodulation signal generated in the demodulation circuit 604, and the reset signal generated in the reset signal generation circuit 607, and generates a response signal; and a modulation circuit 605 which modulates the response signal generated in the signal processing circuit 606 into a wireless signal.

In the structure in this embodiment, the signal processing circuit 606 operates based on the constant voltage generated in the regulator 608. The signal processing circuit 606 includes a plurality of registers, which need to be initialized before the signal processing circuit 606 operates using the demodulation signal generated in the demodulation circuit 604. Accordingly, each register in the signal processing circuit 606 is initialized by the reset signal which is generated by the reset signal generation circuit 607 based on the constant voltage generated in the regulator 608.

Note that the reset signal generation circuit used in the structure in this embodiment may have either of the configurations shown in Embodiments 1 and 2.

Embodiment 5

Figure 7:
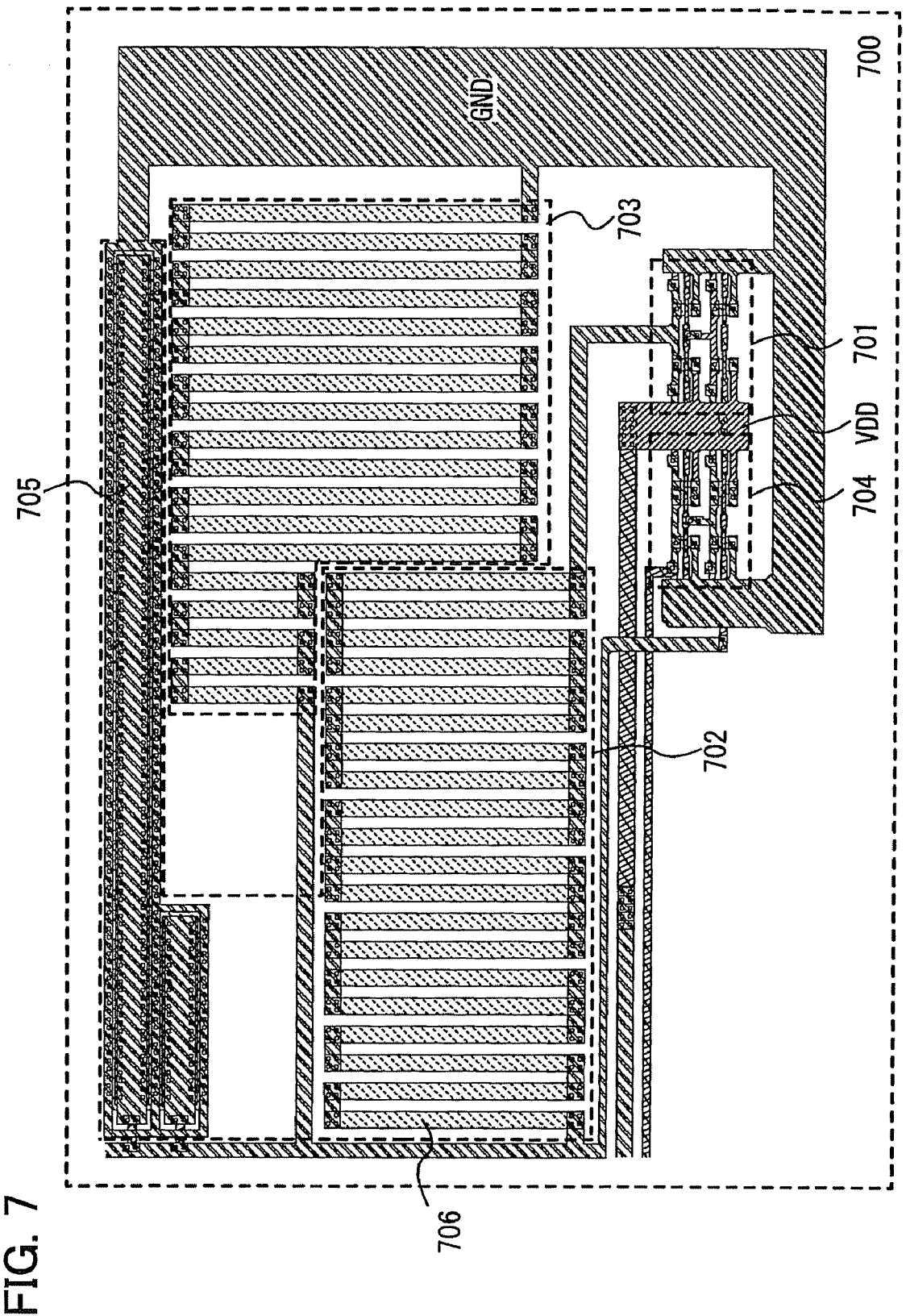
FIG. 7 illustrates a semiconductor device according to one embodiment of the present invention.

In this embodiment, a layout diagram corresponding to the reset signal generation circuit shown in Embodiment 1 is illustrated in FIG. 7. A reset signal generation circuit 700 includes a first buffer circuit 701, a low pass filter 702, a resistor 703, and a second buffer circuit 704. The low pass filter 702 includes a capacitor 705 and a resistor 706.

In this embodiment, the on-resistance of a p-channel transistor is assumed to be twice the on-resistance of an n-channel transistor. Here, when an inverter is designed, for example, it is preferable to make the time necessary for rising of an output waveform of the inverter and the time necessary for falling of the output waveform thereof equal to each other. Accordingly, the on-resistance of the p-channel transistor and the on-resistance of the n-channel transistor need to be made the same. Accordingly, when the transistors with the above characteristics are used, it is necessary to perform design for making the on-resistance the same in such a manner that the channel width of the p-channel transistor is set to be twice the channel width of the n-channel transistor, or that the channel length of the p-channel transistor is set to be half the channel length of the n-channel transistor.

In this embodiment, in order to make the time necessary for rising and the time necessary for falling of the second buffer circuit 704 equal to each other, the channel width of the p-channel transistor is set about twice as large as the channel width of the n-channel transistor in the second buffer circuit 704. It is needless to say that the structure is not limited to this.

Here, in one embodiment of the present invention, it is preferable to make the on-resistance of the p-channel transistor greater than the on-resistance of the n-channel transistor in the first buffer circuit 701, that is, it is preferable that the channel width of the p-channel transistor be less than twice the channel width of the n-channel transistor in the first buffer circuit 701. Thus, rising of the waveform of an output signal from the first buffer circuit 701 can be further delayed. Further, when the area occupied by the capacitor 705 of the low pass filter 702 needs to be reduced in terms of layout, a period for generating a reset signal can be secured by increasing the internal load of the p-channel transistor included in the first buffer circuit 701 instead.

Embodiment 6

In this embodiment, a manufacturing method for obtaining the semiconductor device described in any of the above embodiments will be described.

Figure 10A:
FIGS. 10A to 10C illustrate a method for manufacturing a semiconductor device according to one embodiment of the present invention.

First, a separation layer 1002 is formed on one surface of a substrate 1001, and then, an insulating film 1003 to be a base and a semiconductor film 1004 (e.g., a film containing amorphous silicon) are formed (see FIG. 10A). The separation layer 1002, the insulating film 1003, and the semiconductor film 1004 can be successively formed. Since the separation layer 1002, the insulating film 1003, and the semiconductor film 1004 are successively formed, they are not exposed to the air, whereby impurities can be prevented from being contained therein.

As the substrate 1001, a glass substrate, a quartz substrate, a metal substrate, a stainless steel substrate, a plastic substrate having heat resistance against the treatment temperature in this process, or the like may be used. Such a substrate has no significant limitation on the area or its shape. Accordingly, for example, in the case of using a substrate which is a rectangular shape having a side length of 1 meter or longer, the productivity can be significantly increased. This is a major advantage as compared to the case of using a circular silicon substrate. Therefore, even when a circuit portion is made larger, the cost can be low as compared to the case of using a silicon substrate.

Note that the separation layer 1002 is provided on the entire surface of the substrate 1001 in this step. Alternatively, if necessary, the separation layer 1002 may be selectively provided by a photolithography method after a separation layer is formed on the entire surface of the substrate 1001. In addition, the separation layer 1002 is formed so as to be in contact with the substrate 1001. Alternatively, if necessary, an insulating film such as a silicon oxide film, a silicon oxynitride film, a silicon nitride film, or a silicon nitride oxide film may be formed so as to be in contact with the substrate 1001, and the separation layer 1002 may be formed so as to be in contact with the insulating film.

Here, oxynitride is a substance that contains more oxygen than nitrogen, and nitride oxide is a substance that contains more nitrogen than oxygen. For example, silicon oxynitride can be a substance including oxygen, nitrogen, silicon, and hydrogen in ranges of 50 at. % to 70 at. % inclusive, 0.5 at. % to 15 at. % inclusive, 25 at % to 35 at. % inclusive, and 0.1 at. % to 10 at. % inclusive, respectively. Further, silicon nitride oxide is a substance including oxygen, nitrogen, silicon, and hydrogen in ranges of 5 at. % to 30 at. % inclusive, 20 at. % to 55 at. % inclusive, 25 at. % to 35 at. % inclusive, and 10 at. % to 30 at. % inclusive, respectively. Note that the above ranges are obtained by measurement using Rutherford backscattering spectrometry (RBS) or hydrogen forward scattering (HFS). Moreover, the total for the content ratio of the constituent elements does not exceed 100 at. %.

As the separation layer 1002, a metal film, a layered structure of a metal film and a metal oxide film, or the like can be used. The metal film is formed to have a single-layer structure or a layered structure of a film formed of an element such as tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), or iridium (Ir); or an alloy material or a compound material which contains any of these elements as its main component. The film can be formed by a sputtering method, various CVD methods such as a plasma CVD method, or the like. For the layered structure of a metal film and a metal oxide film, after the above metal film is formed, oxide or oxynitride of the metal film can be provided on the metal film surface by performing plasma treatment in an oxygen atmosphere or an $N_2O$ atmosphere, or heat treatment in an oxygen atmosphere or an $N_2O$ atmosphere. Alternatively, after the metal film is formed, the surface of the metal film is treated with a strong oxidative solution such as ozone water, whereby oxide or oxynitride of the metal film can be provided on the surface of the metal film.

The insulating film 1003 is formed to have a single-layer structure or a layered structure of a film containing silicon oxide or silicon nitride by a sputtering method, a plasma CVD method, or the like. In the case where the insulating film to be the base has a two-layer structure, a silicon nitride oxide film may be formed for a first layer, and a silicon oxynitride film may be formed for a second layer, for example. In the case where the insulating film to be the base has a three-layer structure, a silicon oxide film, a silicon nitride oxide film, and a silicon oxynitride film may be formed for a first layer, a second layer, and a third layer, respectively. Alternatively, a silicon oxynitride film, a silicon nitride oxide film, and a silicon oxynitride film may be formed for a first layer, a second layer, and a third layer, respectively. The insulating film 1003 to be the base functions as a blocking film for preventing impurities from entering from the substrate 1001.

The semiconductor film 1004 is formed to a thickness of approximately 25 nm to 200 nm, preferably approximately 50 nm to 70 nm, specifically a thickness of 66 nm by a sputtering method, an LPCVD method, a plasma CVD method, or the like. As the semiconductor film 1004, an amorphous silicon film may be formed, for example.

Figure 10B:
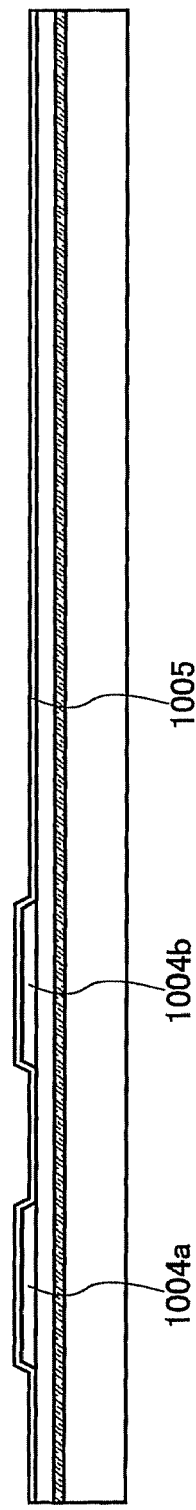

Next, the semiconductor film 1004 is crystallized by laser light irradiation. Note that the semiconductor film 1004 may be crystallized by a method in which laser light irradiation is combined with a thermal crystallization method using rapid thermal anneal (RTA) or an annealing furnace, or a thermal crystallization method using a metal element for promoting crystallization, or the like. Then, the obtained crystalline semiconductor film is etched to have a desired shape to form semiconductor films 1004a and 1004b, and a gate insulating film 1005 is formed so as to cover the semiconductor films 1004a and 1004b (see FIG. 10B).

An example of steps for manufacturing the semiconductor films 1004a and 1004b will be briefly described below. First, an amorphous semiconductor film (e.g., an amorphous silicon film) is formed by a plasma CVD method. Next, a solution containing nickel which is a metal element for promoting crystallization is retained on the amorphous semiconductor film, and after that, the amorphous semiconductor film is subjected to dehydrogenation treatment (500° C. for 1 hour) and thermal crystallization treatment (550° C. for 4 hours) to form a crystalline semiconductor film. Then, when necessary, the crystalline semiconductor film is irradiated with laser light from a laser depending on the degree of crystallinity, and the semiconductor films 1004a and 1004b are formed by a photolithography method. Note that without being subjected to the thermal crystallization which uses the metal element for promoting crystallization, the amorphous semiconductor film may be crystallized only by laser light irradiation.

Alternatively, the semiconductor films 1004a and 1004b can be obtained by crystallizing a semiconductor film by irradiation with continuous wave laser light or laser light that oscillates at a frequency of 10 MHz or more, which is scanned in one direction. With such crystallization, the semiconductor films have characteristics that their crystals grow in the scanning direction of laser light. A transistor is preferably arranged so that the channel length direction (the direction in which carriers flow when a channel formation region is formed) is aligned with the scanning direction.

Next, the gate insulating film 1005 which covers the semiconductor films 1004a and 1004b is formed. The gate insulating film 1005 is formed to have a single-layer structure or a layered structure of a film containing silicon oxide or silicon nitride by a CVD method, a sputtering method, or the like. Specifically, the gate insulating film 1005 is formed to have a single-layer structure or a layered structure of a silicon oxide film, a silicon oxynitride film, and/or a silicon nitride oxide film.

Alternatively, the gate insulating film 1005 may be formed by performing plasma treatment on the semiconductor films 1004a and 1004b to oxidize or nitride the surface thereof. For example, the gate insulating film 1005 is formed by plasma treatment with a mixed gas of a rare gas such as He, Ar, Kr, and Xe, and oxygen, nitrogen oxide ($NO_2$), ammonia, nitrogen, hydrogen, and the like. When plasma is excited with microwaves in this case, plasma with a low electron temperature and high density can be generated. With oxygen radical (which may include OH radical) or nitrogen radical (which may include NH radical) generated by the high density plasma, the surface of the semiconductor film can be oxidized or nitrided.

By such high-density plasma treatment, an insulating film with a thickness of approximately 1 nm to 20 nm, typically approximately 5 nm to 10 nm is formed on the surface of the semiconductor films. Since the reaction in this case is a solid-phase reaction, the interface state density between the insulating film and the semiconductor films can be quite low. Since such plasma treatment directly oxidizes (or nitrides) a semiconductor film (formed of crystalline silicon or polycrystalline silicon), variation in thickness of the insulating film to be aimed can be extremely small. Further, oxidation does not proceed at crystal grain boundaries of crystalline silicon, which makes a very preferable condition. In other words, by a solid-phase oxidation of the surface of the semiconductor film by the high-density plasma treatment shown here, an insulating film with good uniformity and low interface state density can be formed without abnormal oxidation reaction at crystal grain boundaries.

As the gate insulating film 1005, only the insulating film formed by plasma treatment may be used, or a stack of the insulating film formed by high-density plasma treatment and an insulating film formed of silicon oxide, silicon oxynitride, silicon nitride, or the like by a CVD method using plasma or thermal reaction may be used. In either case, transistors including a gate insulating film that partly or entirely includes the insulating film formed by plasma treatment have less variation in characteristics, which is preferable.

Moreover, when the semiconductor films 1004a and 1004b are formed in such a manner that a semiconductor film is irradiated with continuous wave laser light or laser light that oscillates at a frequency of 10 MHz or more and is scanned in one direction for crystallization, thin film transistors (TFTs) with little characteristic variation and high field effect mobility can be obtained by using the gate insulating film subjected to the above plasma treatment.

Then, a conductive film is formed over the gate insulating film 1005. Here, a single-layer conductive film with a thickness of approximately 100 nm to 500 nm is formed. For the conductive film, the following material can be used: a material containing an element such as tantalum (Ta), tungsten (W), titanium (Ti), molybdenum (Mo), aluminum (Al), copper (Cu), chromium (Cr), or niobium (Nb); an alloy material mainly containing the element; or a compound material mainly containing the element. Alternatively, a semiconductor material typified by polycrystalline silicon to which an impurity element such as phosphorus is added may be used. In the case where the conductive film has a layered structure, for example, it is possible to use a layered structure of a tantalum nitride film and a tungsten film, a layered structure of a tungsten nitride film and a tungsten film, or a layered structure of a molybdenum nitride film and a molybdenum film. For example, a layered structure of a 30-nm-thick tantalum nitride film and a 150-nm-thick tungsten film can be used. Since tungsten and tantalum nitride have high heat resistance, heat treatment for thermal activation can be performed after the conductive film is formed. Further, the conductive film may have a layered structure of three or more layers, and for example, a layered structure of a molybdenum film, an aluminum film, and a molybdenum film may be used.

Next, a resist mask is formed over the conductive film by a photolithography method, and etching is performed for forming a gate electrode and a gate wiring, whereby a gate electrode 1007 is formed above the semiconductor films 1004a and 1004b.

Next, a resist mask is formed by a photolithography method, and an impurity element imparting n-type conductivity or p-type conductivity is added to the semiconductor films 1004a and 1004b at a low concentration by an ion doping method or an ion implantation method. In this embodiment, an impurity element imparting n-type conductivity is added to the semiconductor films 1004a and 1004b at a low concentration. As the impurity element imparting n-type conductivity, an element belonging to Group 15, for example, phosphorus (P) or arsenic (As) can be used. As the impurity element imparting p-type conductivity, an element belonging to Group 13, for example, boron (B) can be used.

Note that only n-channel TFTs are shown in this embodiment for simplicity. In the case where an n-channel TFT and a p-channel TFT included in the reset signal generation circuit according to Embodiments 1 to 5 are formed at the same time, an impurity element imparting n-type conductivity is added using a mask covering a semiconductor layer to be included in the p-channel TFT, and an impurity element imparting p-type conductivity is added using a mask covering a semiconductor layer to be included in the n-channel TFT, whereby the impurity element imparting n-type conductivity and the impurity element imparting p-type conductivity can be selectively added. It is needless to say that the order of the addition of the impurity element is not limited to the above.

Subsequently, an insulating film is formed so as to cover the gate insulating film 1005 and the gate electrode 1007. The insulating film is formed to have a single-layer structure or a layered structure of a film containing an inorganic material such as silicon, silicon oxide, or silicon nitride or a film containing an organic material such as an organic resin by a plasma CVD method, a sputtering method, or the like. Then, the insulating film is selectively etched by anisotropic etching mainly in the perpendicular direction, so that insulating films 1008 (also referred to as sidewalls) which are in contact with the side surfaces of the gate electrode 1007 are formed. The insulating films 1008 are used as masks when an impurity element is added later for forming LDD (lightly doped drain) regions.

Figure 10C:
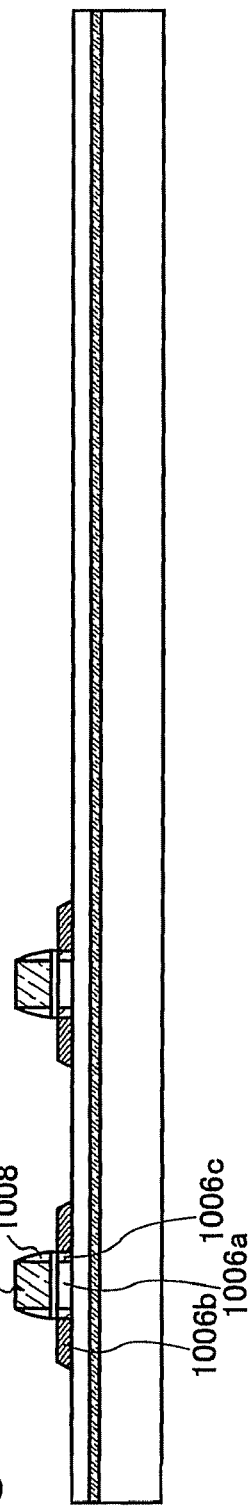

Next, an impurity element imparting n-type conductivity is added to the semiconductor films 1004*a* and 1004*b* using a resist mask formed by a photolithography method, the gate electrode 1007, and the insulating films 1008 as masks. Accordingly, a channel formation region 1006*a*, first impurity regions 1006*b*, and second impurity regions 1006*c* are formed (see FIG. 10C). The first impurity region 1006*b* functions as a source region or a drain region of a thin film transistor, and the second impurity region 1006*c* functions as an LDD region. The concentration of the impurity element contained in the second impurity region 1006*c* is lower than that of the impurity element contained in the first impurity region 1006*b*.

Then, an insulating film having a single-layer structure or a layered structure is formed so as to cover the gate electrode 1007, the insulating films 1008, and the like. This embodiment shows an example of a three-layer structure of insulating films 1009, 1010, and 1011. These insulating films can be formed by a CVD method. A 50-nm-thick silicon oxynitride film, a 200-nm-thick silicon nitride oxide film, and a 400-nm-thick silicon oxynitride film can be formed as the insulating films 1009, 1010, and 1011, respectively. The surface of each insulating film is along the shape of the surface of a layer provided below, although depending on the thickness of the insulating film. In other words, since the insulating film 1009 is thin, its surface closely corresponds to the shape of the surface of the gate electrode 1007. The film surface is flatter as the thickness of the film is larger; therefore, the surface of the insulating film 1011 which is the thickest in the three-layer structure is almost flat. However, the surface of the insulating film 1011 is different from a flat surface because its material is not an organic material. That is, if the surface of the insulating film is desired to be flat, an organic material such as polyimide, polyamide, benzocyclobutene, acrylic, or epoxy, a siloxane material, or the like may be used. Further, these insulating films can be formed by a sputtering method, an SOG method, a droplet discharging method, a screen printing method, or the like other than a CVD method.

After the insulating films 1009, 1010, and 1011 and the like are etched by a photolithography method to form contact holes reaching the first impurity regions 1006*b*, conductive films 1031*a* functioning as source and drain electrodes of the thin film transistor and a conductive film 1031*b* functioning as a connection wiring are formed. The conductive films 1031*a* and 1031*b* can be formed by forming a conductive film so as to fill the contact holes and selectively etching the conductive film. Note that before the conductive film is formed, silicide may be formed on part of surfaces of the semiconductor films 1004*a* and 1004*b* which is exposed at the contact holes, so as to reduce the resistance. The conductive films 1031*a* and 1031*b* are preferably formed using a low-resistance material because signal delay does not occur. Since the low-resistance material often has low heat resistance, a material with high heat resistance is preferably provided above and below the low-resistance material. For example, it is preferable that aluminum be formed to a thickness of 300 nm as the low-resistance material and titanium be formed to a thickness of 100 nm above and below aluminum. Further, when the conductive film 1031*b* functioning as the connection wiring has the same layered structure as the conductive film 1031*a*, reduction in resistance and increase in heat resistance of the connection wiring can be realized. Alternatively, the conductive films 1031*a* and 1031*b* can be formed to have a single-layer structure or a layered structure of another conductive material, for example, a material containing an element such as tungsten (W), tantalum (Ta), molybdenum (Mo), nickel (Ni), platinum (Pt), copper (Cu), gold (Au), silver (Ag), manganese (Mn), neodymium (Nd), carbon (C), or silicon (Si); or an alloy material or a compound material containing the element as its main component. An alloy material containing aluminum as its main component corresponds to, for example, a material that contains aluminum as its main component and also contains nickel, or an alloy material that contains aluminum as its main component and also contains nickel and one or both of carbon and silicon. Moreover, the conductive films 1031*a* and 1031*b* can be formed by a CVD method, a sputtering method, or the like.

Through the above steps, an element layer 1049 including a thin film transistor 1030*a* and a thin film transistor 1030*b* is obtained (see FIG. 11A).

Note that before the insulating films 1009, 1010, and 1011 are formed, after the insulating film 1009 is formed, or after the insulating films 1009 and 1010 are formed, heat treatment is preferably performed in order to recover the crystallinity of the semiconductor film 1004, activate the impurity element added to the semiconductor film 1004, and hydrogenate the semiconductor film 1004. For the heat treatment, a thermal annealing method, a laser annealing method, an RTA method, or the like may be employed.

Next, insulating film 1012 and 1013 are formed so as to cover the conductive films 1031*a* and 1031*b* (see FIG. 11B). This embodiment shows an example in which a 100-nm-thick silicon nitride film is used as the insulating film 1012, and a 1500-nm-thick polyimide film is used as the insulating film 1013. The surface of the insulating film 1013 preferably has high planarity. Accordingly, the planarity of the insulating film 1013 is improved with a thick-film structure, for example, with a thickness of 750 nm to 3000 nm (specifically 1500 nm) in addition to the characteristics of polyimide, which is an organic material. An opening portion is formed in the insulating films 1012 and 1013. In this embodiment, the case of forming an opening portion 1014 at which the conductive film 1031*b* is exposed is described. In the opening portion 1014 (specifically, in a region 1015 surrounded by a dotted line), the edge of the insulating film 1012 is covered with the insulating film 1013. By covering the edge of the insulating film 1012 in the lower layer with the insulating film 1013 in the upper layer, breakage of a wiring which is to be formed in the opening portion 1014 later can be prevented. In this embodiment, since polyimide, which is the organic material, is used for the insulating film 1013, the insulating film 1013 can have a gentle tapered shape in the opening portion 1014, so that breakage can be efficiently prevented. Examples of a material for the insulating film 1013 which is effective in preventing breakage are an organic material such as polyamide, benzocyclobutene, acrylic, and epoxy; and a siloxane material, in addition to polyimide. Further, a silicon oxynitride film or a silicon nitride oxide film may be used as the insulating film 1012 instead of the silicon nitride film. Moreover, the insulating films 1012 and 1013 can be formed by a CVD method, a sputtering method, an SOG method, a droplet discharging method, a screen printing method, or the like.

Next, a conductive film 1017 is formed over the insulating film 1013, and an insulating film 1018 is formed over the conductive film 1017 (see FIG. 11C). The conductive film 1017 can be formed using the same material as the conductive films 1031*a* and 1031*b*, and for example, can employ a layered structure of a 100-nm-thick titanium film, a 200-nm-thick aluminum film, and a 100-nm-thick titanium film. The conductive film 1017 is connected to the conductive film 1031b in the opening portion 1014, so that the contact resistance can be reduced because the titanium films are in contact with each other. Moreover, since a current based on a signal between the thin film transistor and an antenna (formed later) flows through the conductive film 1017, the wiring resistance is preferably low. Therefore, a low-resistance material such as aluminum is preferably used for the conductive film 1017. Alternatively, the conductive film 1017 can be formed to have a single-layer structure or a layered structure of another conductive material, for example, a material containing an element such as tungsten (W), tantalum (Ta), molybdenum (Mo), nickel (Ni), platinum (Pt), copper (Cu), gold (Au), silver (Ag), manganese (Mn), neodymium (Nd), carbon (C), or silicon (Si); or an alloy material or a compound material containing the element as its main component. An alloy material containing aluminum as its main component corresponds to, for example, a material that contains aluminum as its main component and also contains nickel, or an alloy material that contains aluminum as its main component and also contains nickel and one or both of carbon and silicon. Moreover, the conductive film 1017 can be formed by a CVD method, a sputtering method, or the like. The insulating film 1018 is preferably formed using an organic material because its surface needs to be flat, and the case of using 2000-nm-thick polyimide is exemplified. The insulating film 1018 needs to planarize the opening portion 1014 in the insulating film 1013 with a thickness of 1500 nm and unevenness of the surface of the conductive film 1017 formed in the opening portion 1014, and is formed with a thickness of 2000 nm so that the insulating film 1018 is thicker than the insulating film 1013. Accordingly, the thickness of the insulating film 1018 is preferably 1.1 times to 2 times, preferably 1.2 times to 1.5 times as large as that of the insulating film 1013. When the insulating film 1013 has a thickness of 750 nm to 3000 nm, the insulating film 1018 preferably has a thickness of 900 nm to 4500 nm. A material with higher planarity is preferably used for the insulating film 1018 while the thickness is considered. Examples of a material with high planarity, which is used for the insulating film 1018, are an organic material such as polyamide, benzocyclobutene, acrylic, and epoxy; and a siloxane material, in addition to polyimide. When an antenna is formed over the insulating film 1018, it is necessary to consider the planarity of the surface of the insulating film 1018 as described above.

Next, an antenna 1020 is formed over the insulating film 1018 (see FIG. 12A). Then, the antenna 1020 and the conductive film 1017 are connected through an opening portion. The opening portion is provided below the antenna 1020 so that higher integration is realized. Note that the antenna 1020 may be directly connected to the conductive film 1031a; however, the provision of the conductive film 1017 as in this embodiment allows a margin to form the opening portion for connection with the antenna 1020, and higher integration is realized, which is preferable. Accordingly, another conductive film may be formed over the conductive film 1017, and the antenna 1020 may be connected to the conductive film. That is, the antenna 1020 is electrically connected to the conductive film 1031a included in the thin film transistor, and high integration is realized with a connection structure through a plurality of conductive films. When the thickness of a plurality of conductive films such as the conductive film 1017 is large, the thickness of the semiconductor device becomes larger; therefore, the thickness of a plurality of conductive films is preferably small. Accordingly, the thickness of the conductive film 1017 and the like is preferably smaller than that of the conductive film 1031a.

The antenna 1020 can have a layered structure of a first conductive film 1021 and a second conductive film 1022. In this embodiment, the case of a layered structure of a 100-nm-thick titanium film and a 5000-nm-thick aluminum film is exemplified. Titanium can improve the moisture resistance of the antenna and the adhesion between the insulating film 1018 and the antenna 1020. Moreover, titanium can reduce the contact resistance with the conductive film 1017. This is because the uppermost layer of the conductive film 1017 is formed from titanium, and thus, the titanium of the conductive film 1017 is in contact with titanium of the antenna, that is, the same materials are in contact with each other. Such a titanium film is formed by dry etching, so that its edge is often steep. Aluminum is a low-resistance material and thus preferably used for the antenna. By making the aluminum film thicker, the resistance can be reduced. Reduction in resistance of the antenna can extend the communication range, which is preferable. Such an aluminum film is formed by wet etching, so that a side surface of its edge is often tapered. A taper in this embodiment is a shape such that the side surface is curved inwardly toward the aluminum, that is, a shape with a curved recessed side surface. Further, when the aluminum is removed by wet etching, the edge of aluminum is positioned inside the edge of titanium (a region 1042). For example, the edge of aluminum is preferably positioned inside the edge of titanium (for the amount of distance L) so that the distance L between the edge of aluminum and the edge of titanium is approximately ⅙ to ½ the thickness of aluminum. In this embodiment, the edge of aluminum is preferably positioned inside the edge of titanium so that the distance L is in the range of 0.8 μm to 2 μm. The edge of titanium projects beyond the edge of aluminum, whereby breakage of an insulating film formed later can be prevented, and the durability of the antenna can be improved.

Instead of using titanium and aluminum, the antenna can be formed using a conductive material such as a material containing a metal element such as silver, copper, gold, platinum, nickel, palladium, tantalum, or molybdenum; or an alloy material or a compound containing such a metal element by a CVD method, a sputtering method, a printing method such as screen printing or gravure printing, a droplet discharging method, a dispenser method, a plating method, or the like. Moreover, although the layered structure is described in this embodiment, the antenna may have a single-layer structure of any of the above materials.

An insulating film 1023 is formed to cover the antenna 1020. In this embodiment, a 200-nm-thick silicon nitride film is formed as the insulating film 1023. The insulating film 1023 can further improve the moisture resistance of the antenna, which is preferable. Since the edge of titanium projects beyond the edge of aluminum, the insulating film 1023 can be formed without breakage. Such an insulating film 1023 can be formed using a silicon oxynitride film, a silicon nitride oxide film, or another inorganic material instead of a silicon nitride film.

Next, a first insulator 1051 is formed so as to cover the insulating film 1023 (see FIG. 12B). This embodiment exemplifies the case where a structure body 1026 in which a fibrous body 1027 is impregnated with an organic resin 1028 is used as the first insulator 1051, and a first impact buffering layer 1050 is provided on the surface of the structure body 1026 in a preferred mode. In this embodiment, an aramid resin is used for the first impact buffering layer 1050.

The structure body 1026 in which the fibrous body 1027 is impregnated with the organic resin 1028 is also referred to as a prepreg. A prepreg is formed specifically as follows: after a fibrous body is impregnated with a varnish in which a matrix resin is diluted with an organic solvent, drying is performed so that the organic solvent is volatilized and the matrix resin is semi-cured. The prepreg has a modulus of elasticity of 13 GPa to 15 GPa and a modulus of rupture of 140 MPa. By using a thinned structure body, a thin semiconductor device capable of being bent can be manufactured. Typical examples of the fibrous body in the prepreg are polyvinyl alcohol fiber, polyester fiber, polyamide fiber, polyethylene fiber, aramid fiber, polyparaphenylene benzobisoxazole fiber, glass fiber, and carbon fiber. Typical examples of a resin forming the matrix resin are an epoxy resin, an unsaturated polyester resin, a polyimide resin, and a fluorine resin.

As an alternative to the structure body 1026, a layer containing a thermosetting resin such as an epoxy resin, an unsaturated polyester resin, a polyimide resin, a bismaleimide-triazine resin, or a cyanate resin can be used for the first insulator 1051. Alternatively, a thermoplastic resin such as a polyphenylene oxide resin, a polyetherimide resin, or a fluorine resin may be used for the first insulator 1051. Further, the first impact buffering layer 1050 may be formed of a high-strength material such as a polyvinyl alcohol resin, a polyester resin, a polyamide resin, a polyethylene resin, a polyparaphenylene benzobisoxazole resin, or a glass resin other than an aramid resin.

The first insulator 1051 has preferably a thickness of 5 μm to 100 μm, more preferably 10 μm to 50 μm, and has a thickness of 32 μm in this embodiment. In this embodiment, in the first insulator 1051, the thickness of the structure body 1026 is 20 μm, and the thickness of the first impact buffering layer 1050 is 12 μm. With such a structure, a thin semiconductor device capable of being bent can be manufactured.

After the first impact buffering layer 1050 is formed, a first conductive layer 1029 is formed on the surface of the first impact buffering layer 1050. The case where a 100-nm-thick compound of silicon oxide and indium tin oxide is used as the first conductive layer 1029 is exemplified. Such a first conductive layer 1029 should have a structure where the resistance is lower than that of the structure body 1026 and the first impact buffering layer 1050. Accordingly, the first conductive layer 1029 may be film-shaped or may be a group of islands with a small space therebetween. Moreover, since the first conductive layer 1029 can have any structure with low resistance, it can have a thickness of 50 nm to 200 nm in consideration of the resistivity of materials used. Increase in thickness is preferable because the resistance can be reduced. Instead of using a compound of silicon oxide and indium tin oxide, the first conductive layer 1029 can be formed using a material containing an element such as titanium, molybdenum, tungsten, aluminum, copper, silver, gold, nickel, tin, platinum, palladium, iridium, rhodium, tantalum, cadmium, zinc, iron, silicon, germanium, zirconium, or barium; or an alloy material or a compound material containing any of the above elements as its main component. The first conductive layer 1029 can be formed by a sputtering method, a plasma CVD method, a coating method, a printing method, a plating method such as an electrolytic plating method or an electroless plating method, or the like. Note that an insulating film may be provided on the surface of the first conductive layer 1029. Accordingly, the first conductive layer 1029 can be protected.

Figure 13:
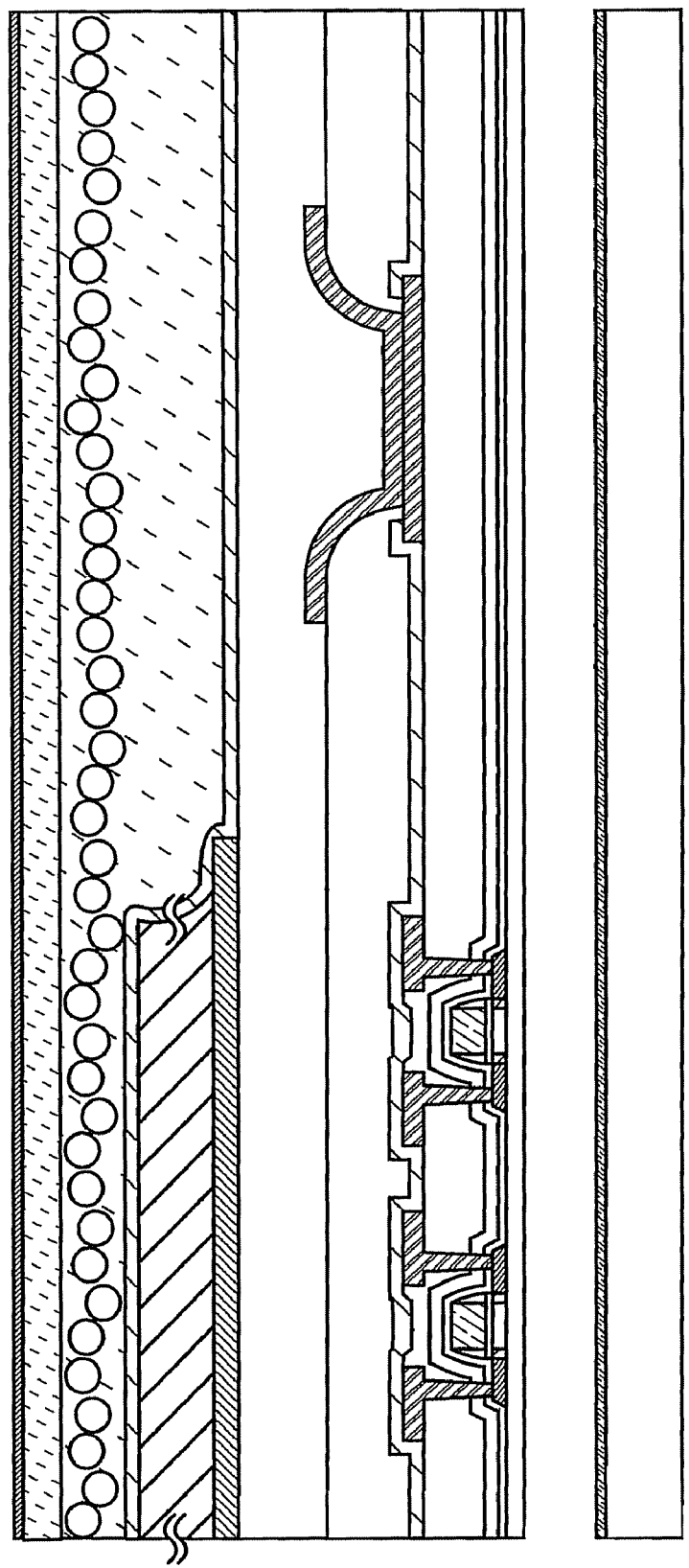
FIG. 13 illustrates a method for manufacturing a semiconductor device according to one embodiment of the present invention.

Next, a layer including the element layer including the thin film transistors 1030a and 1030b, the conductive film functioning as the antenna 1020, and the like is separated from the substrate 1001 (see FIG. 13). At this time, the layer is separated at the interface between the separation layer 1002 and the substrate 1001, at the interface between the separation layer 1002 and the insulating film 1003, or inside the separation layer 1002 so as to be peeled off. When the separation layer 1002 is left on the layer, it may be removed by etching or the like if not necessary. Thus, the adhesion between the layer and a layer to be formed later can be improved.

Note that the layer is separated while a surface at which separation is performed is wetted using water or a solution such as ozone water, whereby the elements such as the thin film transistors 1030a and 1030b can be prevented from being damaged by static electricity or the like. This is because unpaired electrons in the separation layer 1002 are terminated with ions in the solution, so that electric charge is neutralized.

Further, by reusing the substrate 1001 after the separation, cost reduction can be realized.

Figure 14:
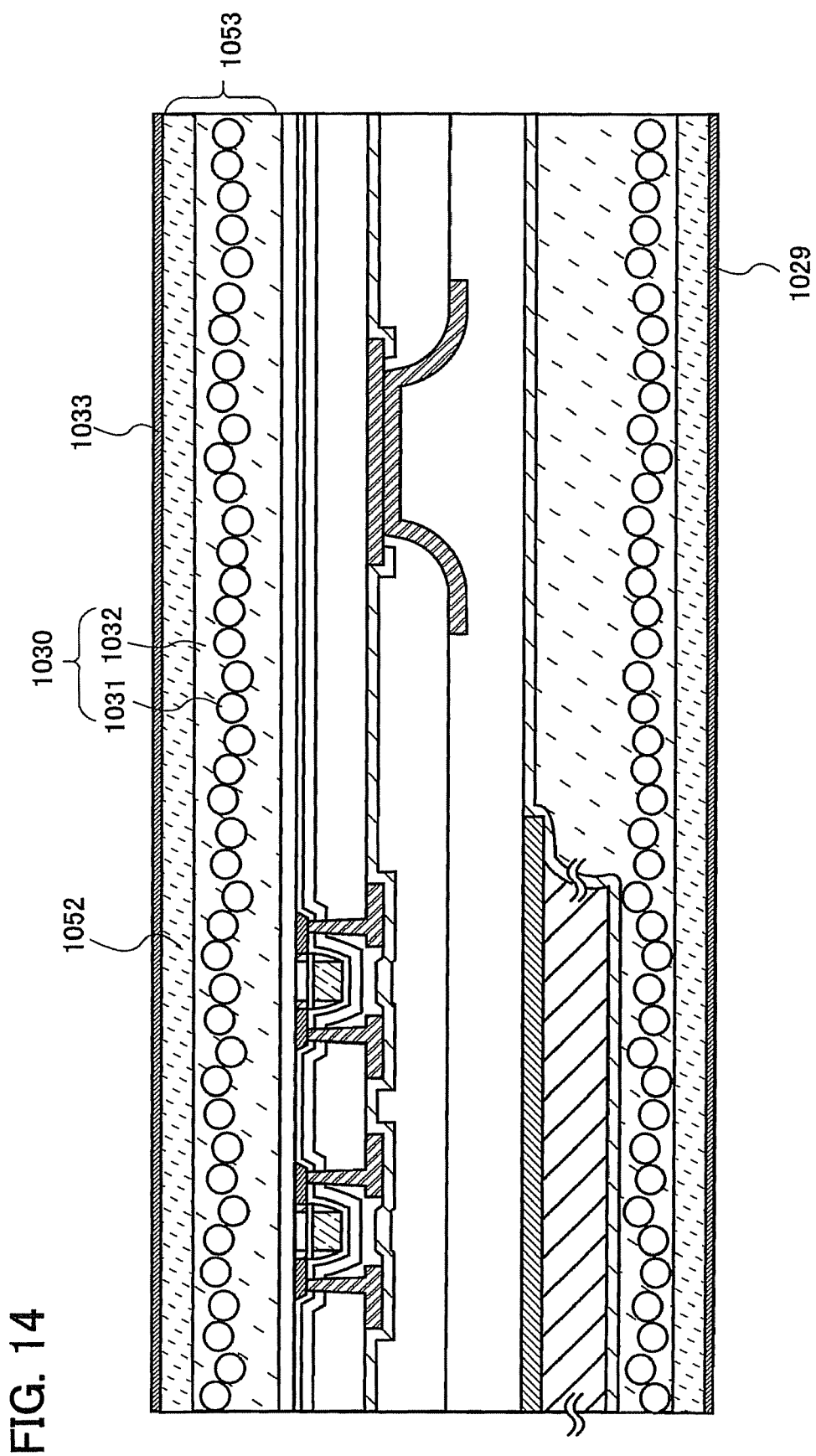
FIG. 14 illustrates a method for manufacturing a semiconductor device according to one embodiment of the present invention.

Then, a second insulator 1053 is formed so as to cover a surface exposed by the separation (see FIG. 14). The second insulator 1053 can be formed in a similar manner to the first insulator 1051. In this embodiment, as the second insulator 1053, a structure body 1030 using a so-called prepreg, in which a fibrous body 1031 is impregnated with an organic resin 1032, is provided, and further, a second impact buffering layer 1052 is provided on the surface of the structure body 1030. An aramid resin is used for the second impact buffering layer 1052. It is needless to say that the layer can be attached only with the structure bodies 1026 and 1030, and the thickness of the semiconductor device in this case is 40 μm to 70 μm, preferably 40 μm to 50 μm. The thickness of the semiconductor device in the case where the first and second impact buffering layers are provided is 70 μm to 90 μm, preferably 70 μm to 80 μm.

Next, a second conductive layer 1033 is formed on the surface of the second insulator 1053. The second conductive layer 1033 can be formed in a similar manner to the first conductive layer 1029. Moreover, an insulating film may be provided on the surface of the second conductive layer 1033. Accordingly, the second conductive layer 1033 can be protected. Through the above steps, a stack is obtained in which the element layer and the antenna are sealed with the first insulator 1051 and the second insulator 1053, the first conductive layer 1029 is provided on the surface of the first insulator 1051, and the second conductive layer 1033 is provided on the surface of the second insulator 1053.

After that, the stack is divided into individual semiconductor devices by a dividing means, although not shown. As the dividing means, a means by which the first insulator 1051 and the second insulator 1053 are melted at the time of division is preferably used. It is more preferable to use a means by which the first conductive layer 1029 and the second conductive layer 1033 are melted. In this embodiment, the stack is divided by laser light irradiation.

There is no particular limitation on the conditions such as wavelength, intensity, and beam size of the laser light used for the division. The laser light irradiation is performed under such conditions that the semiconductor devices can be divided. As a laser for the laser light, the following laser can be used, for example: a continuous-wave laser such as an Ar laser, a Kr laser, a $CO_2$ laser, a YAG laser, a $YVO_4$ laser, a YLF laser, a $YAlO_3$ laser, a $GdVO_4$ laser, a $Y_2O_3$ laser, a ruby laser, an alexandrite laser, a Ti:sapphire laser, or a helium-cadmium laser; or a pulsed laser such as an Ar laser, a Kr laser, an excimer (ArF, KrF, or XeCl) laser, a $CO_2$ laser, a YAG laser, a $YVO_4$ laser, a YLF laser, a $YAlO_3$ laser, a $GdVO_4$ laser, a $Y_2O_3$ laser, a ruby laser, an alexandrite laser, a Ti:sapphire laser, a copper vapor laser, or a gold vapor laser.

As described in this embodiment, by dividing the stack into separate semiconductor devices by laser light irradiation, the resistance between the first conductive layer 1029 and the second conductive layer 1033 is reduced, whereby electrical continuity is established between the first conductive layer 1029 and the second conductive layer 1033. Accordingly, the step of dividing the semiconductor devices and the step of establishing electrical continuity between the first conductive layer 1029 and the second conductive layer 1033 can be performed at a time.

The resistance between the first conductive layer 1029 and the second conductive layer 1033 is lower than that of the first insulator 1051 or the second insulator 1053, and may be, for example, 1 G$\Omega$ or less, preferably approximately 5 M$\Omega$ to 500 M$\Omega$, and more preferably approximately 10 M$\Omega$ to 200 M$\Omega$ Accordingly, the semiconductor devices may be divided by laser light irradiation or the like so that such a condition is obtained.

In such a manner, the semiconductor device formed using an insulating substrate can be completed.

This embodiment can be implemented in combination with any of the other embodiments as appropriate.

Embodiment 7

In this embodiment, examples of applications modes of a semiconductor device including the reset signal generation circuit described in Embodiments 1 to 6 will be described.

Figure 15A:
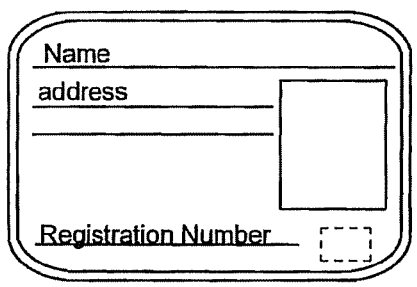
FIGS. 15A to 15F each illustrate an example of the provision of a semiconductor device according to one embodiment of the present invention.
Figure 15B:
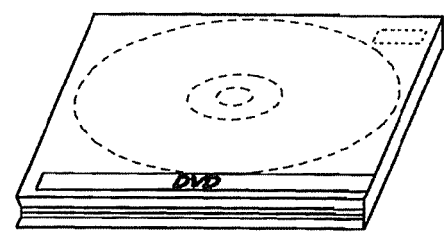
Figure 15C:
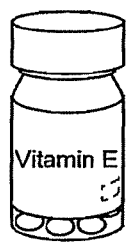
Figure 15D:
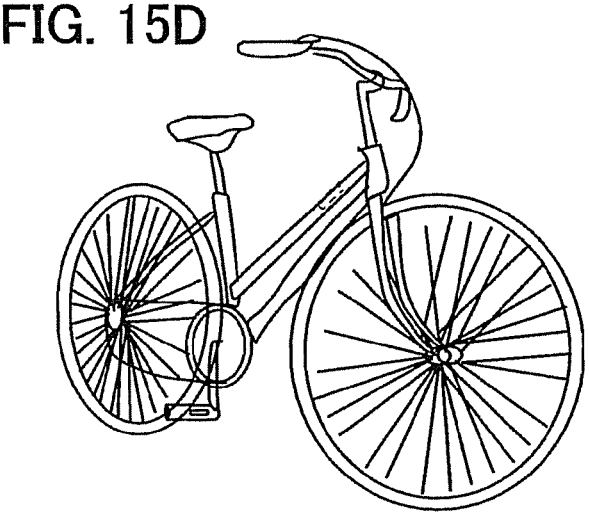
Figure 15E:
Figure 15F:
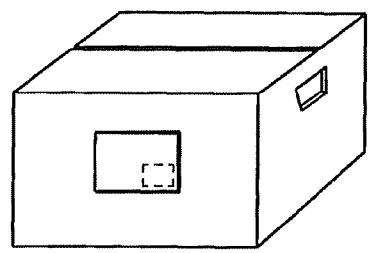
Figure 16:
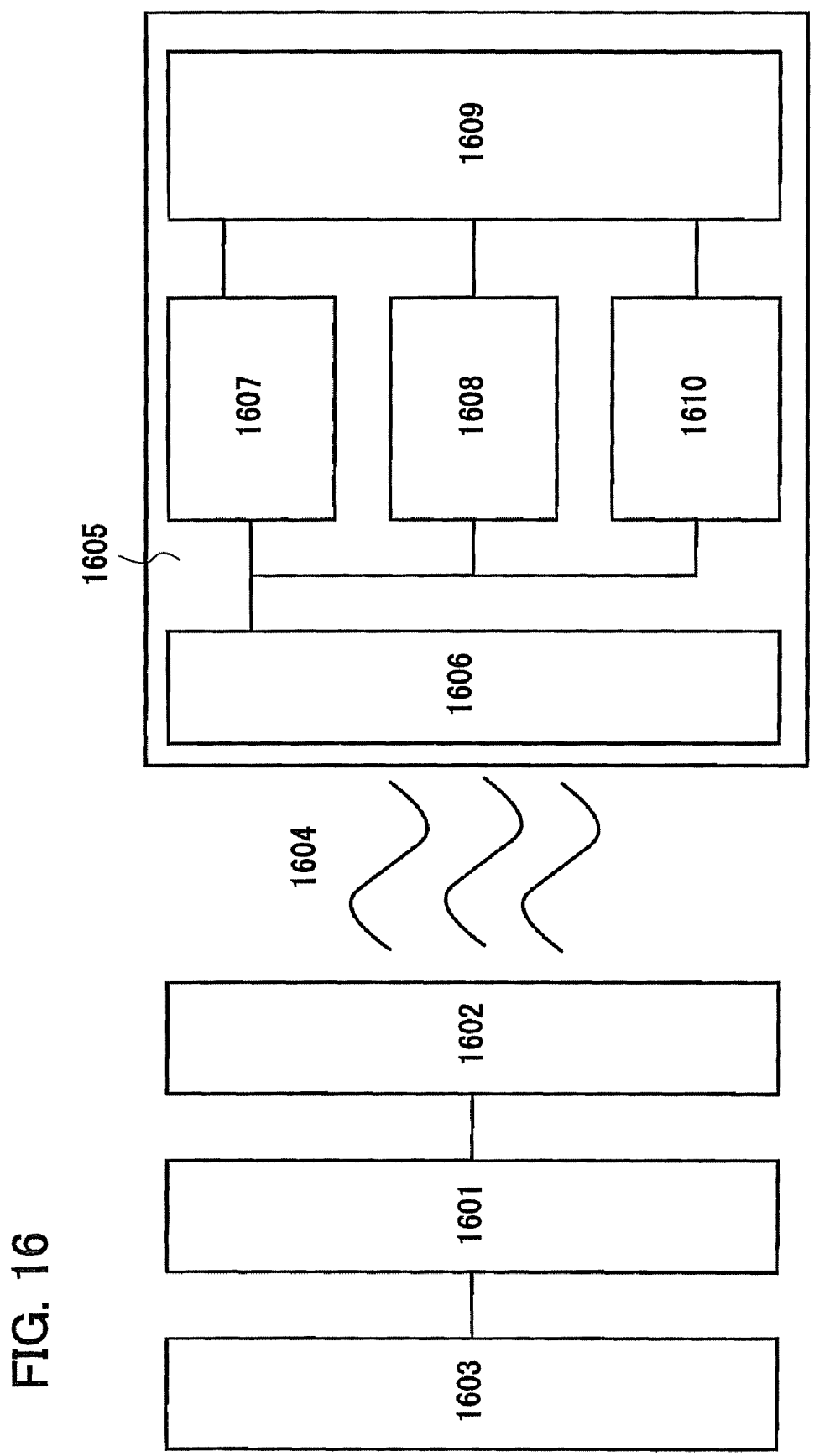
FIG. 16 illustrates a conventional semiconductor device.

As illustrated in FIGS. 15A to 15F, the semiconductor device can be employed for a wide range of applications and can be provided in, for example, objects such as bills, coins, securities, bearer bonds, certificates (e.g., driver's licenses and resident cards, see FIG. 15A), containers for wrapping (e.g., wrapping paper and bottles, see FIG. 15C), recording media (e.g., DVD software and video tapes, see FIG. 15B), vehicles (e.g., bicycles, see FIG. 15D), personal belongings (e.g., bags and glasses), foods, plants, animals, human bodies, clothes, daily commodities, and electronic devices (e.g., liquid crystal display devices, EL display devices, television units, and mobile phones), and tags attached to a product (see FIGS. 15E and 15F).

A semiconductor device which is one embodiment of the present invention is mounted on a printed substrate, attached to a surface, or incorporated to be fixed in an object. For example, the semiconductor device is incorporated in paper of a book or an organic resin of a package to be fixed in an object. Since the semiconductor device which is one embodiment of the present invention is small, thin, and lightweight, an attractive design of the object itself is not damaged even after the semiconductor device is fixed in the object. In addition, when the semiconductor device which is one embodiment of the present invention is provided in bills, coins, securities, bearer bonds, certificates, or the like, a certification function can be obtained and forgery thereof can be prevented by using the certification function. Further, when the semiconductor device which is one embodiment of the present invention is attached to containers for wrapping, recording media, personal belongings, foods, clothes, daily commodities, electronic devices, or the like, a system such as an inspection system can be efficiently used. Furthermore, when the semiconductor device which is one embodiment of the present invention is attached to vehicles, safety against theft or the like can be increased.

As described above, when a semiconductor device including the reset signal generation circuit which is one embodiment of the present invention is used for applications described in this embodiment, data used for exchanging information can be held at an accurate value. Therefore, the authenticity of an object or the reliability of security can be increased.

Note that this embodiment can be combined with any of the other embodiments as appropriate.

This application is based on Japanese Patent Application serial No. 2008-254551 filed with Japan Patent Office on Sep. 30, 2008, the entire contents of which are hereby incorporated by reference.

EXPLANATION OF REFERENCE

100: reset signal generation circuit, 101: buffer circuit, 102: low pass filter, 103: resistor, 104: buffer circuit, 105: node, 106: node, 111: p-channel transistor, 112: p-channel transistor, 113: n-channel transistor, 114: n-channel transistor, 115: resistor, 116: capacitor, 117: p-channel transistor, 118: p-channel transistor, 119: n-channel transistor, 120: n-channel transistor, 201: period, 300: reset signal generation circuit, 301: buffer circuit, 302: low pass filter, 303: resistor, 304: buffer circuit, 305: low pass filter, 306: resistor, 307: buffer circuit, 308: node, 309: node, 310: node, 311: node, 321: p-channel transistor, 322: p-channel transistor, 323: n-channel transistor, 324: n-channel transistor, 325: resistor, 326: capacitor, 327: p-channel transistor, 328: p-channel transistor, 329: n-channel transistor, 330: n-channel transistor, 331: resistor, 332: capacitor, 333: p-channel transistor, 334: p-channel transistor, 335: n-channel transistor, 336: n-channel transistor, 401: period, 501: passive RFID tag, 502: antenna, 503: rectifier circuit, 504: demodulation circuit, 505: modulation circuit, 506: signal processing circuit, 507: reset signal generation circuit, 601: passive RFID tag, 602: antenna, 603: rectifier circuit, 604: demodulation circuit, 605: modulation circuit, 606: signal processing circuit, 607: reset signal generation circuit, 608: regulator, 700: reset signal generation circuit, 701: buffer circuit, 702: low pass filter, 703: resistor, 704: buffer circuit, 705: capacitor, 706 resistor, 805: node, 806: node, 1001: substrate, 1002: separation layer, 1003: insulating film, 1004: semiconductor film, 1004a: semiconductor film, 1004b: semiconductor film, 1005: gate insulating film, 1006a: channel formation region, 1006b: first impurity region, 1006c: second impurity region, 1007: gate electrode, 1008: insulating film, 1009: insulating film, 1010: insulating film, 1011: insulating film, 1012: insulating film, 1013: insulating film, 1014: opening portion, 1015: region, 1017: conductive film, 1018: insulating film, 1020: antenna, 1021: conductive film, 1022: conductive film, 1023: insulating film, 1026: structure body, 1027: fibrous body, 1028: organic resin, 1029: conductive layer, 1030: structure body, 1030a: thin film transistor, 1030b: thin film transistor, 1031: fibrous body, 1031a: conductive film, 1031b: conductive film, 1032: organic resin, 1033: conductive layer, 1042: region, 1049: element layer, 1050: impact buffering layer, 1051: insulator, 1052: impact buffering layer, 1053: insulator, 1601: reader/writer, 1602: antenna, 1603: control terminal, 1604: carrier wave, 1605: passive RFID tag, 1606: antenna, 1607: power supply circuit, 1608: demodulation circuit, 1609: signal processing circuit, 1610: modulation circuit

The invention claimed is:

1. A reset signal generation circuit comprising:
 a first buffer circuit configured to be supplied with a power supply voltage;
 a low pass filter;
 a resistor; and
 a second buffer circuit,
 wherein a signal generated in the second buffer circuit rises later than a rise of the power supply voltage, wherein an interval between the rise of the signal generated in the second buffer circuit and the rise of the power supply voltage is used as a reset signal, wherein an output terminal of the first buffer circuit is electrically connected to an input terminal of the low pass filter, wherein an output terminal of the low pass filter is electrically connected to one terminal of the resistor and an input terminal of the second buffer circuit, and wherein a constant potential is supplied to the other terminal of the resistor.

2. The reset signal generation circuit according to claim 1, wherein a signal output from the first buffer circuit is delayed by the low pass filter, wherein a waveform of the delayed signal is shaped by the second buffer circuit, and wherein electric charge held in the low pass filter is discharged through the resistor when supply of the constant potential is stopped.

3. A semiconductor device comprising:

an antenna;

a rectifier circuit configured to generate an internal power supply from a signal received by the antenna;

a demodulation circuit configured to demodulate a signal received by the antenna;

a reset signal generation circuit configured to generate a reset signal from the internal power supply;

a signal processing circuit configured to perform predetermined operation using the internal power supply, a demodulation signal generated in the demodulation circuit, and the reset signal; and a modulation circuit configured to modulate a response signal generated in the signal processing circuit into a wireless signal, wherein the reset signal generation circuit includes a first buffer circuit configured to be supplied with a power supply voltage, a low pass filter, a resistor, and a second buffer circuit, wherein a signal generated in the second buffer circuit rises later than a rise of the power supply voltage, wherein an interval between the rise of the signal generated in the second buffer circuit and the rise of the power supply voltage is used as the reset signal, wherein an input terminal of the first buffer circuit is electrically connected to an output terminal of the rectifier circuit, wherein an output terminal of the first buffer circuit is electrically connected to an input terminal of the low pass filter, wherein an output terminal of the low pass filter is electrically connected to one terminal of the resistor and an input terminal of the second buffer circuit, wherein an output terminal of the second buffer circuit is electrically connected to an input terminal of the signal processing circuit, and wherein a constant potential is supplied to the other terminal of the resistor.

4. The semiconductor device according to claim 3, wherein a signal output from the first buffer circuit is delayed by the low pass filter, wherein a waveform of the delayed signal is shaped by the second buffer circuit, and wherein electric charge held in the reset signal generation circuit is discharged through the resistor when supply of the constant potential is stopped.

5. The semiconductor device according to claim 4, being a passive wireless tag driven by generating the internal power supply by using electronic power of an electromagnetic wave from a reader/writer.

6. The semiconductor device according to claim 3, being a passive wireless tag driven by generating the internal power supply by using electronic power of an electromagnetic wave from a reader/writer.

* * * * *